United States Patent
Cheatham, III et al.

(10) Patent No.: US 11,990,249 B2
(45) Date of Patent: May 21, 2024

(54) FUEL ELEMENT WITH MULTI-SMEAR DENSITY FUEL

(71) Applicant: TerraPower, LLC, Bellevue, WA (US)

(72) Inventors: Jesse R. Cheatham, III, Bellevue, WA (US); Ryan N. Latta, Bellevue, WA (US); Samuel J. Miller, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 650 days.

(21) Appl. No.: 16/518,890

(22) Filed: Jul. 22, 2019

(65) Prior Publication Data

US 2020/0027577 A1 Jan. 23, 2020

Related U.S. Application Data

(62) Division of application No. 15/245,594, filed on Aug. 24, 2016, now Pat. No. 10,410,753.

(Continued)

(51) Int. Cl.
*G21C 3/30* (2006.01)
*G21C 1/02* (2006.01)
(Continued)

(52) U.S. Cl.
CPC .............. *G21C 3/04* (2013.01); *G21C 1/026* (2013.01); *G21C 3/16* (2013.01); *G21C 7/005* (2013.01);
(Continued)

(58) Field of Classification Search
CPC ... G21C 3/04; G21C 3/02; G21C 3/16; G21C 3/047; G21C 21/02; G21C 3/60
See application file for complete search history.

(56) References Cited

U.S. PATENT DOCUMENTS 4,493,814 A 1/1985 Beard, Jr. et al.
2005/0220251 A1 10/2005 Yokoyama et al.
(Continued)

FOREIGN PATENT DOCUMENTS

JP 41021399 A 12/1941
JP S5149391 A 10/1974
(Continued)

OTHER PUBLICATIONS

Ogata, Takanari, and Takeshi Yokoo. "Development and validation of ALFUS: an irradiation behavior analysis code for metallic fast reactor fuels." Nuclear technology 128.1 (1999): 113-123. (Year: 1999).*

(Continued)

*Primary Examiner* — Jack W Keith
*Assistant Examiner* — Joshua C Devorkin
(74) *Attorney, Agent, or Firm* — FisherBroyles, LLP; Jeremy P. Sanders

(57) ABSTRACT

A fuel element has a ratio of area of fissionable nuclear fuel in a cross-section of the tubular fuel element perpendicular to the longitudinal axis to total area of the interior volume in the cross-section of the tubular fuel element that varies with position along the longitudinal axis. The ratio can vary with position along the longitudinal axis between a minimum of 0.30 and a maximum of 1.0. Increasing the ratio above and below the peak burn-up location associated with conventional systems reduces the peak burn-up and flattens and shifts the burn-up distribution, which is preferably Gaussian. The longitudinal variation can be implemented in fuel assemblies using fuel bodies, such as pellets, rods or annuli, or fuel in the form of metal sponge and meaningfully increases efficiency of fuel utilization.

13 Claims, 33 Drawing Sheets

Related U.S. Application Data

(60) Provisional application No. 62/210,609, filed on Aug. 27, 2015.

(51) Int. Cl.
*G21C 3/04* (2006.01)
*G21C 3/16* (2006.01)
*G21C 7/00* (2006.01)
*G21C 21/08* (2006.01)
*G21D 3/00* (2006.01)
*G21C 3/42* (2006.01)

(52) U.S. Cl.
CPC ............. *G21C 21/08* (2013.01); *G21D 3/001* (2013.01); *G21C 3/045* (2019.01); *G21C 3/047* (2019.01); *G21C 3/42* (2013.01); *Y02E 30/30* (2013.01)

(56) References Cited

U.S. PATENT DOCUMENTS

2009/0252283 A1* 10/2009 Ahlfeld .................... G21C 3/64
376/451
2014/0169516 A1* 6/2014 Dunavant ................ G21C 3/10
376/434
2014/0341331 A1 11/2014 Cheatham et al.

FOREIGN PATENT DOCUMENTS

| JP | S50102473 | * | 8/1975 |
| JP | S50102473 | A | 8/1975 |
| JP | S62276490 | A | 12/1987 |
| JP | 4351872 | B2 | 1/1996 |
| JP | 09113663 | A | 5/1997 |
| JP | 2005337898 | A | 5/2004 |
| JP | 3735392 | B2 | 10/2005 |
| JP | 2014119454 | A | 6/2014 |
| JP | 2015031574 | A | 2/2015 |
| JP | 2019021399 | A | 2/2019 |
| WO | 2015112984 | A1 | 7/2015 |
| WO | 2017091256 | A2 | 6/2017 |

OTHER PUBLICATIONS

Golvchenko, Thesis, Chapter 4: Design, Manufacture, Testing in BOR-60 and BN-350 and PIE of Full-Size Elements, pp. 69-120.
Golvchenko, Thesis in full-In Russian language, pp. 1-197.
PCT/US2016/048392 International Search report and Written Opinion dated Aug. 27, 2015.

* cited by examiner

FUEL ELEMENT WITH MULTI-SMEAR DENSITY FUEL

CROSS-REFERENCE TO RELATED APPLICATIONS

The application is a divisional of, and claims benefit of priority to, U.S. application having Ser. No. 15/245,594, filed Aug. 24, 2016, entitled "FUEL ELEMENT WITH MULTI-SMEAR DENSITY FUEL," which claims the benefit of priority to U.S. Provisional Patent Application No. 62/210,609, entitled "FUEL ELEMENT WITH MULTI-SMEAR DENSITY FUEL" and filed on Aug. 27, 2015, which applications are specifically incorporated herein for all that they disclose and teach.

FIELD OF THE DISCLOSURE

The present disclosure relates to nuclear fission reactors and fuel elements, particularly for fast reactors, such as breed and burn reactors. In particular, the present disclosure relates to tubular fuel elements in which a ratio of area of fissionable nuclear fuel in a cross-section of the tubular fuel element perpendicular to the longitudinal axis to total area of the interior volume in the cross-section of the tubular fuel element (or a smear density) varies with position along the longitudinal axis of the fuel element. This longitudinal variation can improve one or more of the operational profile, strain distribution, and burn-up distribution relative to the burn-up limit.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

In conventional nuclear reactors, fuel loading in the fuel elements is typically uniform along a longitudinal direction of the fuel assemblies. During irradiation in the reactor, the fuel expands due to, for example, the production of fission products and, in particular, fission products in the form of gas. The expanded fuel expands within the available space of the inner diameter of a cladding of an individual fuel element. However, over time and at higher burn-up values, the expansion of the fuel can strain the cladding, particularly where gas retention occurs and when fission products (gas or solid) begin to fill voids within the fuel. At this point, cladding strain may become proportional to burn-up and cladding strain begins to increase, quickly. This strain ultimately limits the life of fuel elements in the reactor core as expansion of the fuel cladding leads to decreased (sometimes non-uniform) coolant flow areas external to the cladding. The rate of strain is increased by the constant effect of radiation on the structural material (cladding and fuel assembly ducts). The fuel elements can expand enough to impart further strain on the duct wall of their associated fuel assemblies, which may become 'jammed' together due to the swelling and/or cause bowing of the fuel assembly. The fuel element swelling may sometimes cause cracks in the cladding which can lead to uncontrolled release of fission products and/or coolant interaction with the fuel. At least in part due to the resulting strain, the maximum burn-up of any particular fuel element can set the useful lifetime of a fuel element and/or the entire fuel assembly.

SUMMARY

Strain imparted on a cladding and fuel assembly influences the upper burn-up limit of fuel elements. A high temperature and high radiation environment can cause fuel to swell, which imparts a strain on the cladding over time. The time, pressure, and temperature conditions associated with cladding failure create a strain limit. Strain is sometimes also analogized with "burn-up" because fuel burn-up creates high temperatures and conditions that contribute to swell of the fuel. Limits on strain and/or burn-up are typically set by the fuel experiencing the greatest neutron flux.

Flux typically takes on a shape (longitudinally and radially) that is based at least in part on fuel and poison distribution within a fuel element. Fuel distributions through the body of the fuel elements have traditionally been uniform, which produces an inverted cosine or a Gaussian flux distribution shape across the uniform distribution of fuel in the longitudinal direction. However, the uniform longitudinal distribution of fuel with attendant longitudinal distribution of flux underutilizes fuel at the longitudinal ends of the fuel element.

The disclosed technology provides precise adjustments to the local conditions of fuel density to equalize fuel performance along the longitudinal length of the fuel elements, increase the average actual burn-up, increase the effective lifetime of the fuel element in the reactor core, equalize the fuel strain, and/or to provide more neutronic contribution (and achieve an increased number of fission reactions or "higher burn-up") from traditionally under-utilized portions of the fuel resulting in increased fuel utilization efficiency.

Adding more fuel at other than the longitudinal location of expected maximum burn-up (or strain) in a fuel element (for example, at the longitudinal ends) can reduce uneven burn-up and decrease the fuel strain. Adding more fuel between the longitudinal ends and the location of the maximum burn-up and/or strain can flatten and shift a burn-up distribution longitudinally within the fuel element which can, overall, generally even-out the burn-up distribution of a fuel element by increasing average burn-up and decreasing the fuel strain. This process is affected by varying the relative amount of fuel per unit volume area as longitudinal location in the fuel element varies along an axis oriented longitudinally, e.g., between a first end and a second end of the fuel element. The variation of this ratio (or smear density) with position along the longitudinal (or axial) axis can be repeated and/or varied among the various fuel elements constituting the fuel assembly and, ultimately the reactor, until the burn-up distribution is longitudinally spread out while maintaining peak core power, criticality of the reactor, etc. The net effect increases the average burn-up of the fuel and increases efficiency of the reactor design and/or operation.

An example embodiment of a fuel element for a nuclear fission reactor comprises a fissionable composition comprising a fissionable nuclear fuel and may contain one or more non-fuel materials. Fissionable fuel may include any fissile fuel and/or fertile fuel and may be mixed, combined or included within the interior volume of the fuel element with other suitable materials, including neutron absorbers, neutron poisons, neutronically transparent materials, etc. Fissile material may include any suitable material for nuclear fission or neutron flux production including uranium, plutonium and/or thorium. Fertile fuel may be any appropriate fertile fuel including natural uranium, un-enriched uranium, etc. which can be bred up to fissile fuel.

The fuel element is generally tubular and has a longitudinal axis. The fissionable composition occupies at least a portion of an interior volume of the tubular fuel element. The fissionable composition may be in thermal transfer contact with an interior surface of the fuel element. A ratio of area of fissionable nuclear fuel in a cross-section of the tubular fuel element perpendicular to the longitudinal axis to total area of the interior volume in the cross-section of the tubular fuel element varies with position along the longitudinal axis.

In one aspect, the ratio can be expressed as a smear density percentage defined by:

$$\text{Smear Density (\%)} = \frac{\text{Area}_{Fuel}}{\text{Area}_{Interior\ Cross-Section}} \times 100$$

where:
  $\text{Area}_{Fuel}$=area of fissionable nuclear fuel in a cross-section of the fuel element perpendicular to the longitudinal axis of the fuel element, and
  $\text{Area}_{Interior\ Cross-Section}$=area of the interior of the cladding in the cross-section of the fuel element perpendicular to the longitudinal axis of the fuel element.

While the fuel elements and related structures and methods disclosed herein will be particularly described with respect to a Traveling Wave Reactor (TWR), the fuel elements and related structures and methods disclosed herein are generally applicable to many types of solid fuel nuclear reactors and may be used in any appropriate nuclear reactor with solid fuel, such as a breed and burn reactor. As used herein, TWR means a type of breed-and-burn and/or breed-and-burn equilibrium nuclear reactor in which waves that breed and then burn may travel relative to the fuel and includes, without limitation, standing wave reactors.

BRIEF DESCRIPTION OF THE DRAWING

The following detailed description of preferred embodiments can be read in connection with the accompanying drawings in which like numerals designate like elements and in which.

DETAILED DESCRIPTION

Figure 1A:
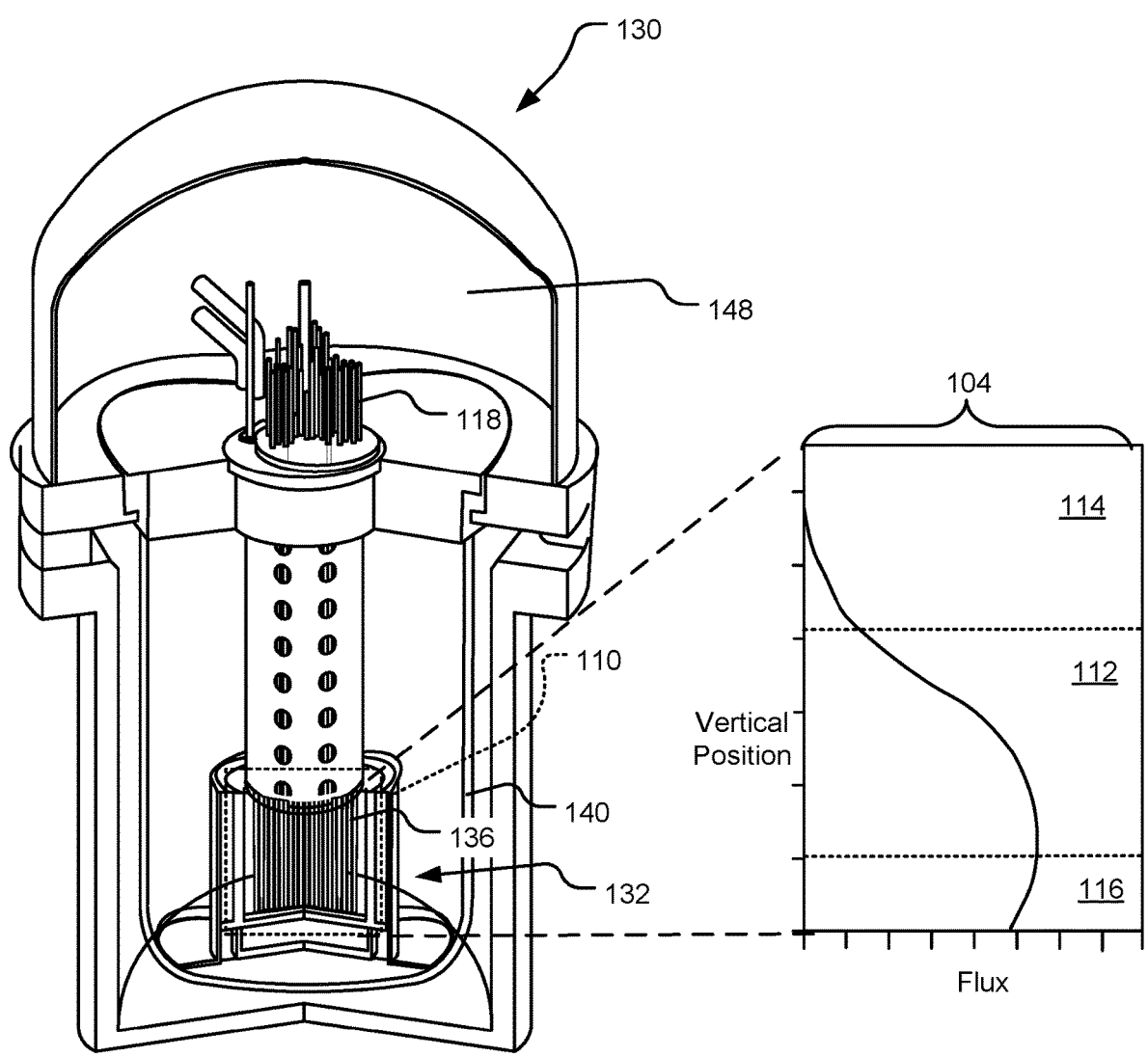
FIG. 1A illustrates an example nuclear fission reactor with a fast nuclear reactor core.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/ process(es) headings; and/or descriptions of single topics may span two or more topic headings). Hence, the use of the formal outline headings is not intended to be in any way limiting.

Disclosed below are a number of techniques for increasing fuel efficiency in a nuclear reactor core. Although some of these techniques are particularly useful in breed and burn reactors, the disclosed technology is also extendable to other types of solid-fueled fission reactors including without limitation fast reactors, breed and burn reactors, sodium cooled reactors, light-water reactors, heavy-water reactors, etc.

As used herein, the term "burn-up," also referred to as "% FIMA" (fissions per initial heavy metal atom) refers to a measure (e.g., a percentage) of fission that occurs in fissile fuel. For example, a burn-up of 5% may indicate that 5% of the fuel underwent a fission reaction. Due to a number of factors, burn-up may not occur evenly along the length of each individual fuel element in a fuel assembly. A fuel element is considered exhausted when a region of the fuel element has undergone enough burn-up to reach a burn-up limit, also sometimes referred to as a "peak burn-up" or "maximum burn-up." When any one location reaches the burn-up limit, the entire fuel element is considered discharged even though only a portion of the fuel within that element has actually reached the discharge limit. Therefore, more energy can be obtained from an individual fuel element when average burn-up is higher along the full length of the fuel element than when average burn-up is lower. In contrast to peak or maximum burn-up, the term "actual burn-up" is used herein to refer to an amount of burn-up that has occurred within a defined area of the fuel assembly at the time when the fuel element is considered discharged because at least a portion of the fuel within the fuel element has reached the burn-up limit.

Burn-up for a given amount of fuel can be influenced by several factors including, for example, neutron flux distribution (e.g., areas of high flux correspond to areas of high burn-up), poison distribution, temperature, coolant flow, heat rate, etc. Thus, a number of implementations disclosed herein generally relate to methods for increasing the average actual burn-up observed within each individual fuel element of a fuel assembly.

Although the following description describes a fast sodium cooled reactor, this is for example purposes only and any solid fueled fission reactor may be used as appropriate. FIG. 1A illustrates an example nuclear fission reactor 130 with a nuclear reactor core 132. The nuclear reactor core 132 is disposed in a reactor vessel 140 surrounded by a guard vessel. The nuclear reactor core 132 typically contains a coolant, such as a pool of coolant (e.g., liquid sodium) or loops through which coolant may flow throughout the nuclear fission reactor 130. In addition, the nuclear reactor core 132 includes a number of elongated fuel assemblies (e.g., a fuel assembly 136) that may each include multiple fuel elements.

In various implementations and/or operational states, the fuel assemblies may include fissile nuclear fuel assemblies (e.g., a set of starter fuel assemblies, etc.) and fertile nuclear fuel assemblies (e.g., a set of feed fuel assemblies, etc.), and/or fuel assemblies that includes both fertile and fissile fuel.

Neutron distribution in the nuclear reactor core 132 is describable by a neutron flux profile 104. The neutron flux profile plot 104 illustrates example neutron flux magnitude as a function of vertical position within a fuel region 110 of the nuclear reactor core 132. Specific characteristics of this profile may vary dramatically from one implementation to another based on characteristics of the nuclear fission reactor 130 and local conditions within the nuclear reactor core 132.

In FIG. 1A, neutron flux is greatest in a central region 112 and tapers off with distance from the central region 112 toward end regions 114 and 116 of the fuel region 110. For example, end regions 114 and 116 may correspond to opposing ends of a fuel element or a group of fuel elements within the nuclear reactor core 132. In the illustrated example, the effect of increased neutron flux in the central region 112 is attributable to one or more factors influencing local conductions such as flux and/or temperature. For example, neutron-absorbing control rods, such as control rod 118 may, in operation, be inserted into the fuel region 110 from the direction of an upper end of the nuclear reactor core 132 toward the central region 112. This may have the effect of reducing neutron flux in the upper end of the fuel region 110, as shown. In other implementations, control rods may be positioned differently to influence neutron flux in a different manner via the same or similar principles.

The neutron flux profile 104 also illustrates unequal average flux and unequal rates of increasing flux in end regions 114 and 116. In one implementation, this effect is due to dissimilar local temperatures in the end regions 114 and 116, respectively. In general, power output is proportional to a mass flow rate multiplied by a difference in temperature between fuel and coolant. Therefore, if a coolant entrance point is, for example, proximal to the end region 116 and a coolant exit point is proximal to the end region 114, a difference in temperature may be larger at the coolant entrance point than the coolant exit point, while the mass flow rate remains approximately uniform at both locations. Consequently, neutron flux (e.g., power output) may be greater near the end region 116 (e.g., the coolant entrance point) and/or may increase more quickly within the end region 116 than within the end region 114. This unequal flux distribution contributes to unequal strain on the individual fuel elements and may cause localized peak burn-up in the regions with greatest neutron flux and/or strain. Consequently, the average burn-up across the full length of each fuel element may be significantly less than the peak burn-up.

If, however, the effects of unequal flux and/or strain can be negated or reduced, the average burn-up across the length of each fuel element is closer to the peak burn-up and higher fuel efficiency is realized. In one implementation, this is accomplished by manipulating a smear density (e.g., a ratio of fissionable material to cross-sectional area) internal to each fuel element to increase average burn-up at a plurality of locations along the longitudinal axis. Techniques for manipulating smear density for improved fuel efficiency are described in detail with respect to the following figures.

Fuel elements are typically long, slender bodies including a thin-walled, outer jacket (also called cladding) and a fissionable composition (including fissionable nuclear fuel) within the cladding. Depending on the design of the nuclear reactor, multiple fuel elements are typically co-located into a fuel bundle or fuel assembly, and multiples of fuel assemblies are included in the nuclear reactor. The geometric shape of the fuel element can be any suitable shape designed for the physical and design constraints of the fuel assembly and the nuclear reactor.

Figure 1B:
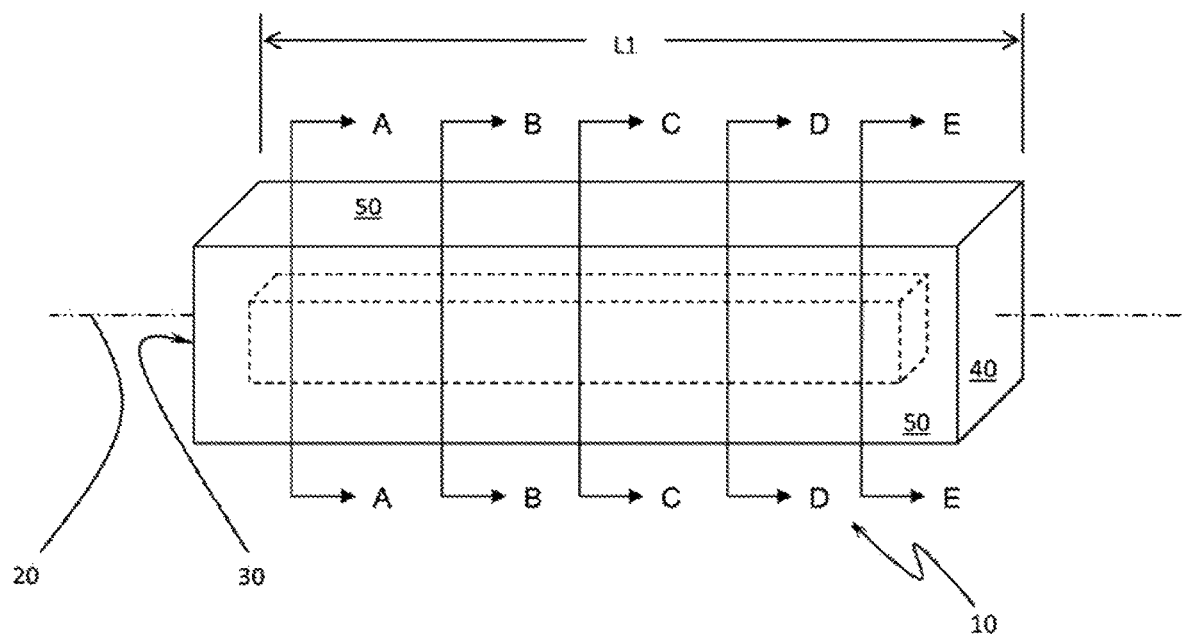
FIGS. 1B and 1C are perspective views of example embodiments of a fuel element, a first embodiment having a general rectilinear shape (FIG. 1B) and the second embodiment having a general cylindrical shape (FIG. 1C).
Figure 1C:
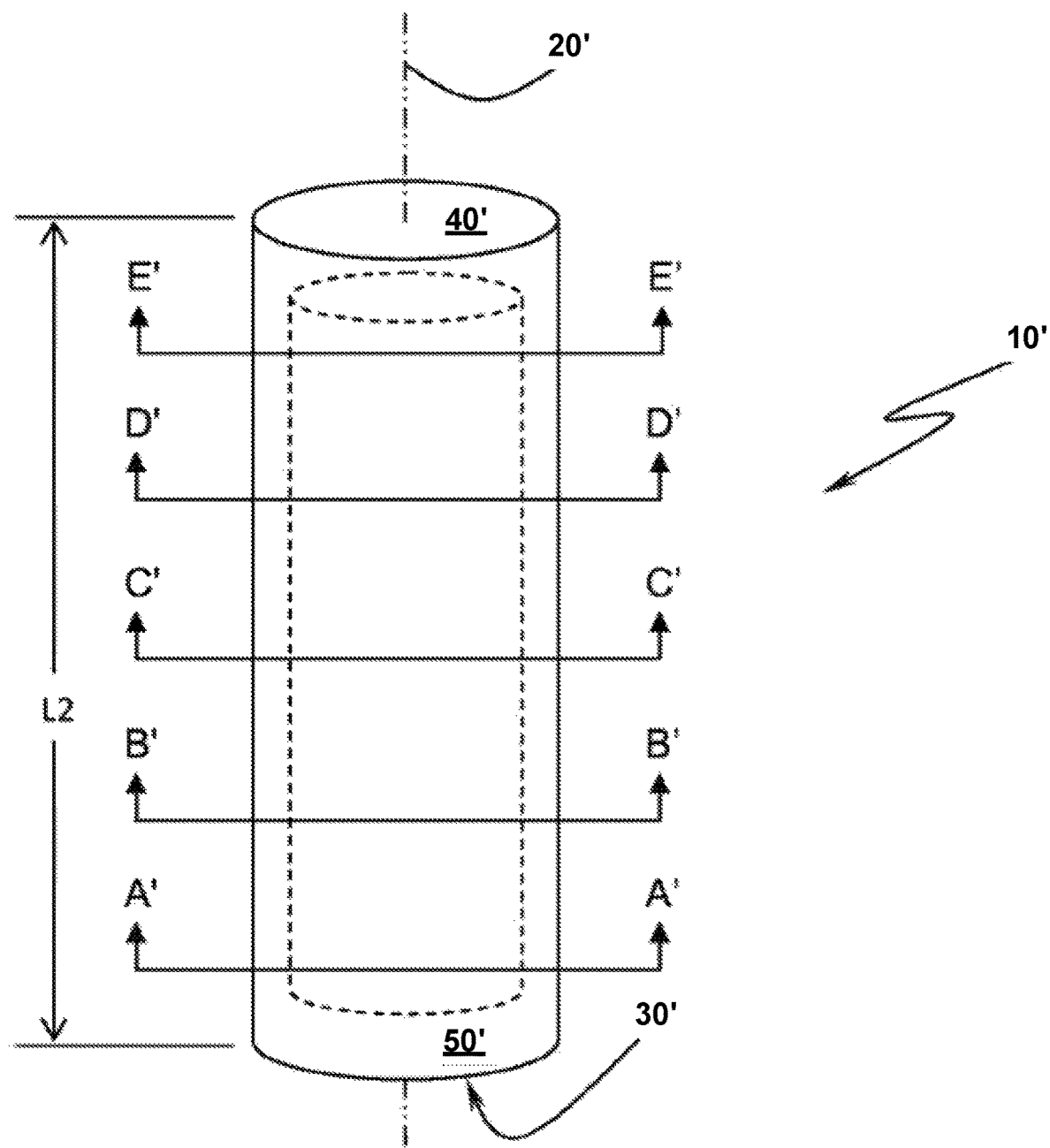
Figure 2:
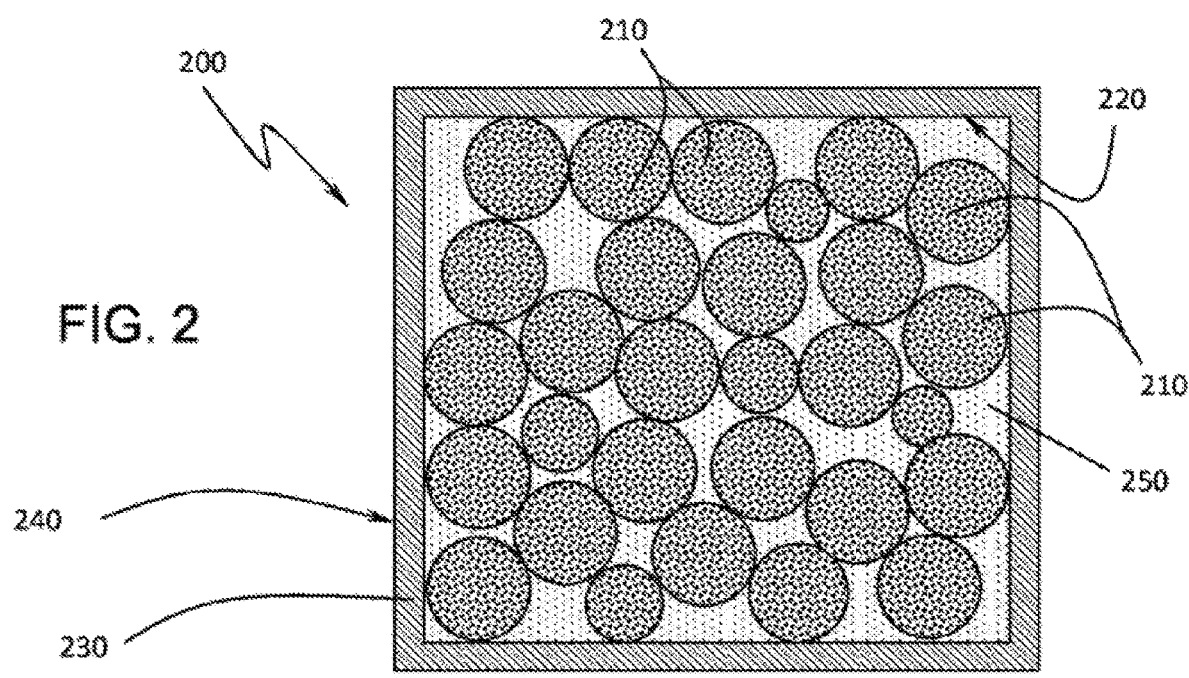
FIGS. 2 to 6 are cross-sectional views taken along sections A-A, B-B and C-C, respectively, of the fuel element shown in FIG. 1B.
Figure 3:
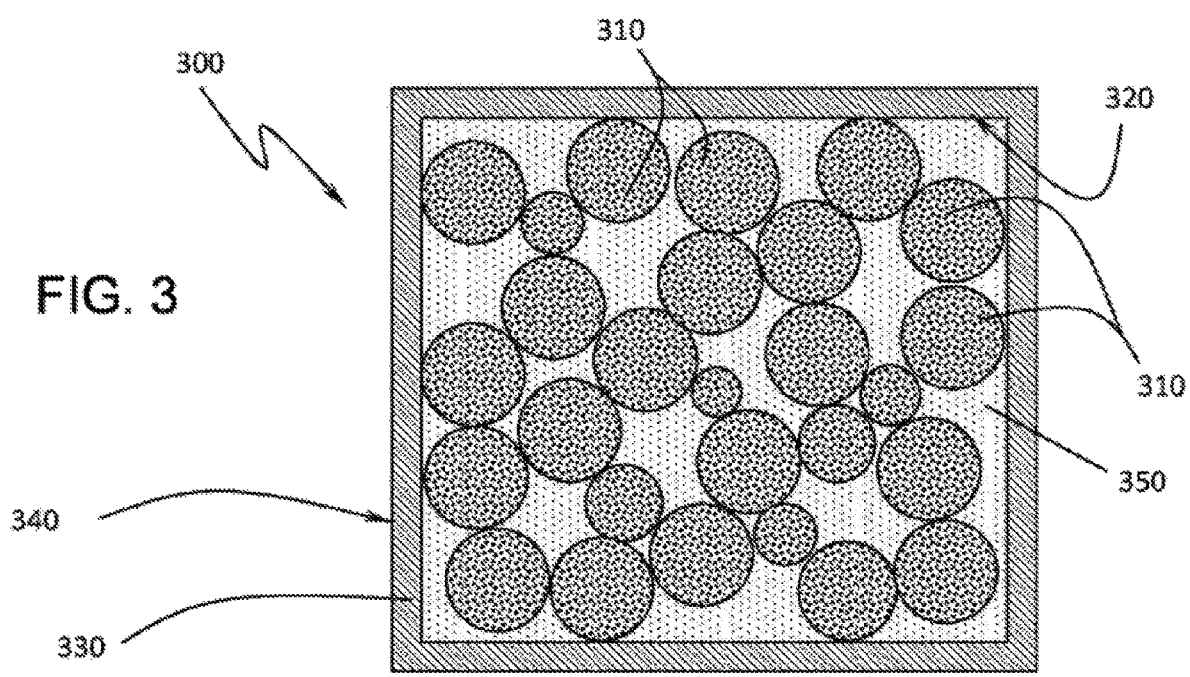
Figure 4:
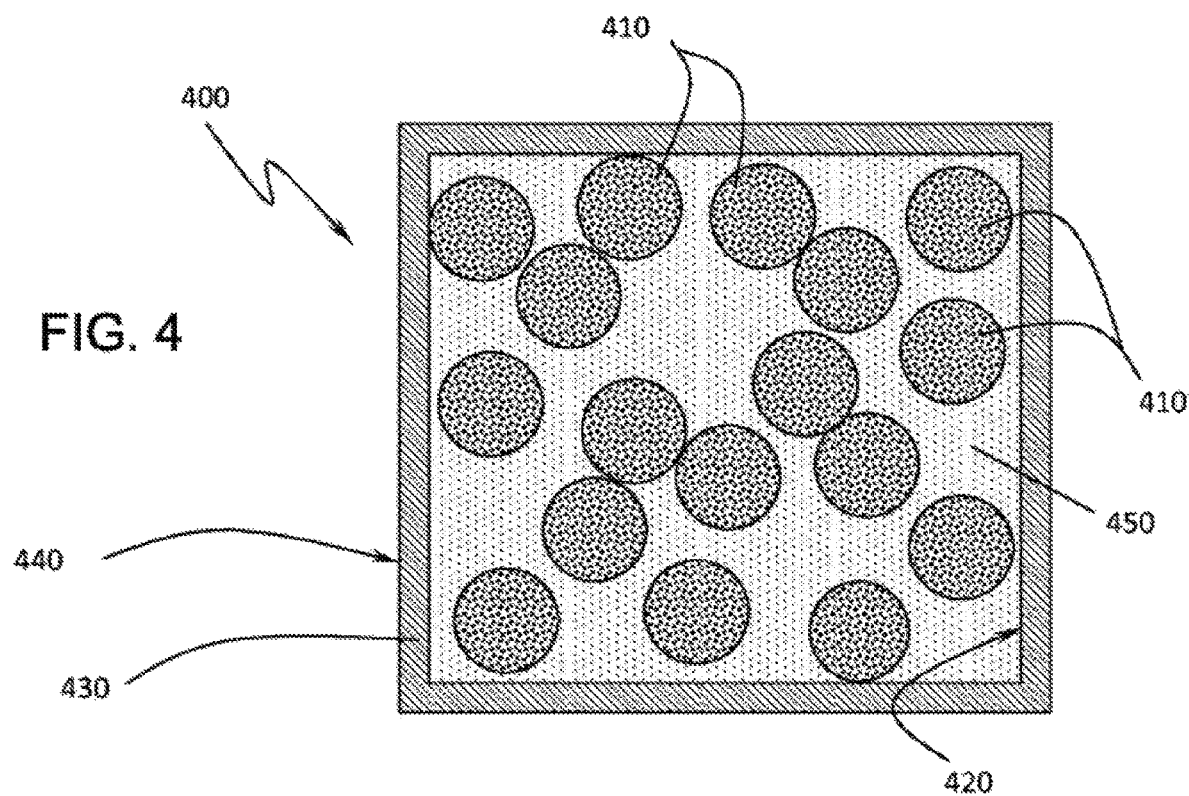
Figure 5:
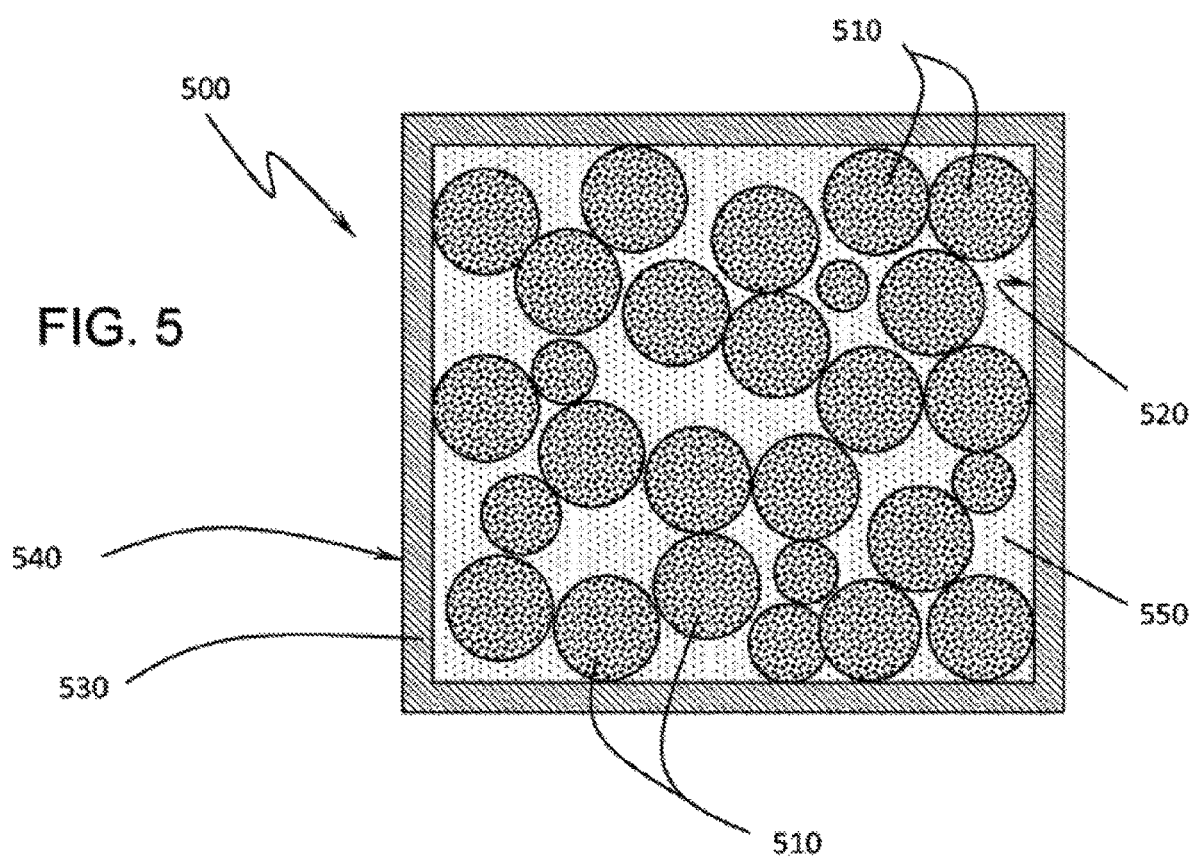
Figure 6:
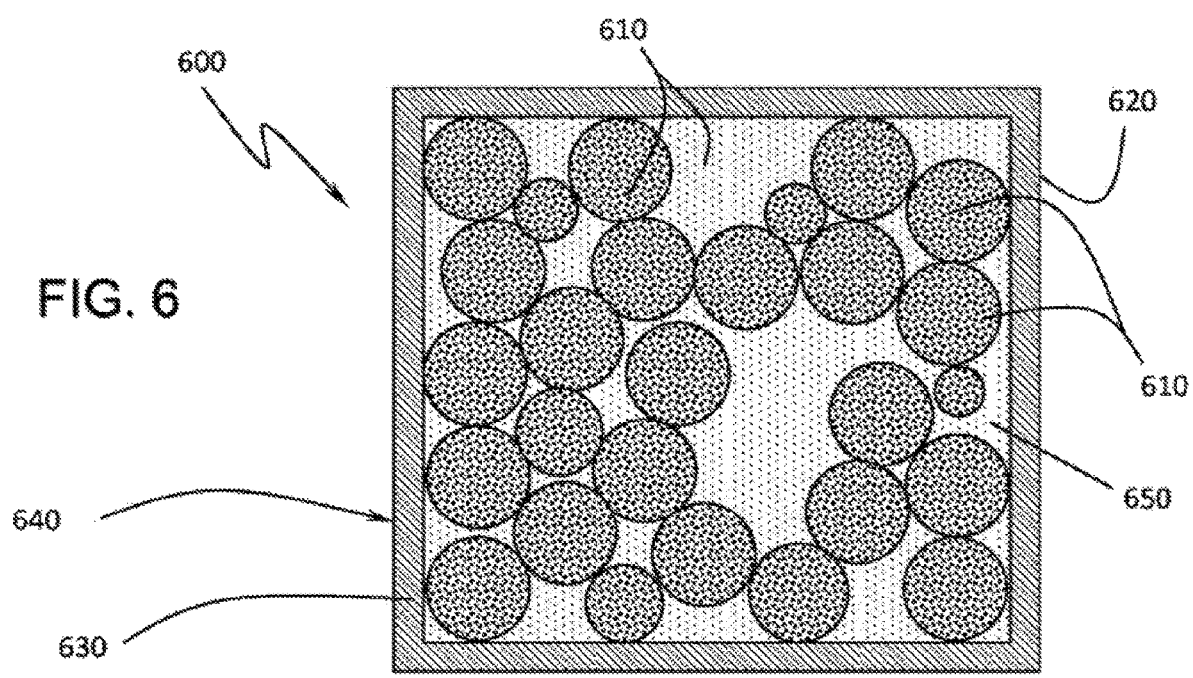

Two example embodiments of fuel elements are illustrated in FIGS. 1B and 1C, in perspective view. A first embodiment of a fuel element 10 has a general tubular shape (FIG. 1B) with an elongated longitudinal axis relative to the radial axis. The tubular shape may be solid throughout, as shown, or may include gaps between the cladding and fissionable composition, gaps or interstitial spaces between the bodies of the fissionable composition, and/or one or more hollow voids within the fissionable composition body (voids). In some cases, the fuel element 10 has a cross-sectional shape, in a plane perpendicular to the longitudinal axis 20 that is rectilinear. In FIG. 1B, the rectilinear shape is a regular polygon such as a square, but the cross-sectional shape can be any rectilinear shape or appropriate polygonal shape including triangular, hexagonal, octagonal, dodecagonal, etc. The longitudinal axis 20 is oriented along the major axis of the general tubular shape and extends longitudinally a distance L1. Typically, the longitudinal axis will extend between a first wall or end 30 and a second wall or end 40 of the cladding. In some examples, side walls 50 join the first end 30 to the second end 40 to define an interior volume and form the general tubular shape of the fuel assembly 10.

A second embodiment of a fuel element 10' has a general tubular shape (FIG. 1C) with an elongated longitudinal axis relative to the radial axis. The tubular shape may be solid throughout, as shown, or may include gaps between the cladding and fissionable composition, gaps or interstitial spaces between the bodies of the fissionable composition, and/or one or more hollow voids within the fissionable composition body (voids). In some cases, the fuel element 10' has a cross-sectional shape, in a plane perpendicular to the central, longitudinal axis 20', that is curved, either concave or convex or combinations thereof. In FIG. 1C, the curved shape is a circle, but the cross-sectional shape can be any ellipse with an eccentricity, e, that varies between 0 and less than 1, i.e., $0 \le e < 1$, alternatively e is equal to or less than 0.5, or any complex curved shape, regular curved shape such as a hyperboloid or a shape approximating a hyperboloid. The longitudinal axis 20' is oriented along the major axis of the general tubular shape and extends longitudinally a distance L2. Typically, the longitudinal axis will extend between a first wall or end 30' and a second wall or end 40' of the cladding. In some examples, side wall 50' joins the first end 30' to the second end 40' to define an interior volume and form the general tubular shape of the fuel assembly 10'. Although the examples shown in FIGS. 1B and 1C show solid walls and ends enclosing the interior volume, it should be appreciated that in some cases the cladding or other structure defining the interior volume of the fuel element may be partial enclosures, solid portions of the fuel element, etc.

The cladding of the fuel element can be any suitable material and may reduce corrosion of the fuel and/or the release of fission products while also having a low absorption cross section for neutrons. In one embodiment, the cladding layer may include at least one material chosen from a metal, a metal alloy, and a ceramic. In one embodiment, the cladding may contain a refractory material, such as a refractory metal including at least one element chosen from Nb, Mo, Ta, W, Re, Zr, V, Ti, Cr, Ru, Rh, Os, Ir, Nd, and Hf. In another embodiment, the cladding may contain a metal alloy, such as steels including steels of different compositions and microstructures. Non-exhaustive examples of suitable materials for the cladding include ceramics, such as silicon-carbide (SiC) and titanium-metal or metalloid-carbides ($Ti_3AlC$ and $Ti_3SiC_2$) and metals, such as aluminum, stainless steel, and zirconium alloys. Other materials suitable for cladding may be used as appropriate.

The cladding may be constructed in two or more layers or regions or include one or more liners of different materials. Examples of appropriate cladding including liners are described in U.S. patent application Ser. No. 13/794,633, filed Mar. 11, 2013, titled "Nuclear Fuel Element", which is incorporated herein by reference.

The fissionable composition can include fissionable nuclear fuel and non-fuel materials. The fissionable nuclear fuel comprises at least about 88 wt % fissionable fuel, e.g., at least 94 wt %, 95 wt %, 98 wt %, 99 wt %, 99.5 wt %, 99.9 wt %, 99.99 wt %, or higher of fissionable fuel. Lower smear densities may be appropriate in other circumstances and within the scope of the invention of selectively varying the smear density along the longitudinal length of the fuel element. Fissionable nuclear fuel includes fissile nuclear fuel, fertile nuclear fuel (which can be 'bred up' to fissile fuel) and/or a mixture of fissile and fertile nuclear fuel compositions. The fissionable nuclear fuel of the fissionable composition can include any nuclide that is capable of undergoing fission after capturing either high-energy (fast) neutrons or low-energy thermal (slow) neutrons. Fissionable fuel may be of a metal form, an oxide form, or a nitride form and may contain a metal and/or metal alloy. Examples of suitable fissionable nuclear fuel include one or more radioactive elements (including their isotopes) selected from the group comprising uranium, plutonium, thorium, americium and neptunium and isotopes and alloys thereof. In one embodiment, the fuel may include at least about 88 wt % U, e.g., at least 94 wt %, 95 wt %, 98 wt %, 99 wt %, 99.5 wt %, 99.9 wt %, 99.99 wt %, or higher of U.

The non-fuel material (if present) of the fissionable composition can include any suitable non-fuel material which may have any feature desirable within the design of the fuel element, including bonding of the nuclear fuel material, neutron transparent or absorbent characteristics, coolant properties, thermal transmission properties, etc. For example, the non-fuel material may include a refractory material, which may include at least one element chosen from Nb, Mo, Ta, W, Re, Zr, V, Ti, Cr, Ru, Rh, Os, Ir, and Hf. In one embodiment, the non-fuel material may include additional burnable poisons, such as boron, gadolinium, or indium.

Fuel elements containing a fissionable composition utilizing fissionable nuclear fuel can have a ratio of area of fissionable nuclear fuel in a cross-section of the tubular fuel element perpendicular to the longitudinal axis to of the interior of the cladding in the cross-section of the tubular fuel element that varies with position along the longitudinal axis. Such ratio can be selectively varied at multiple different locations along the longitudinal axis to selectively design a strain profile for the fuel element that is achieved by targeting expected strain and/or burn-up for the expected flux and fuel assembly movement over the fuel cycles of the fuel assembly lifetime. The strain profile may account for or consider any one or more of the effects of nuclear reactor operations, such as material strain, temperature and pressure effects, production of reaction by-products and gas release fractions, within the design envelope of the fuel element, fuel assembly and nuclear reactor and additionally may also account for or maintain selected reactor core characteristics which may include any one or more of core criticality ($k_{eff} > 1$), peak core power, etc. Despite burn-up alone not being sufficient to determine strain definitively without additional information including operational temperature, reaction by-product, geometries of components, etc., burnup is highly correlated to strain, and is a potential proxy for strain. One of skill in the art, however, will understand that burn-up limit is an appropriate proxy for strain in some cases, and strain is a possible proxy for burn-up limits in some cases. Some examples below are described using burn-up limits and other examples are described using strain profiles. One of skill in the art will recognize that either burn-up limits or strain limits, or any other suitable parameter or reactor core characteristic may be used as a threshold and/or profile, such as measure of fission products, measure of deformation, temperature, etc. As noted above, selective adjustment of the smear density over the length of the fuel element can tailor local areas of the fuel element to expected local conditions, which may include one or more of burn-up, heat rate, coolant flow and/or temperature, displacement per atom (DPA), DPA history and/or rate, etc. along the longitudinal length of the fuel elements. Increasing the average actual burn-up can increase the effective lifetime of the fuel element in the reactor core, allow for efficient use of nuclear fuel, and/or allow the fuel element to have more neutronic contribution (and achieve higher burn-up) as compared to traditional reactors with under-utilized portions.

The ratio of fissionable material to cross-sectional area can vary with position along the longitudinal axis of the fuel element, which as noted above can reduce detrimental effects (burn-up and/or strain) and may increase the utilization of fuel over time along the longitudinal axis.

The ratio can be expressed as a smear density of the fuel element. For example, the smear density percentage can be defined by:

$$\text{Smear Density } (\%) = \frac{\text{Area}_{Fuel}}{\text{Area}_{Interior\ Cross\text{-}Section}} \times 100$$

where:
Area$_{Fuel}$=area of fissionable nuclear fuel in a cross-section of the fuel element perpendicular to the longitudinal axis of the fuel element, and
Area$_{Interior\ Cross\text{-}Section}$=area of the interior of the cladding in the cross-section of the fuel element perpendicular to the longitudinal axis of the fuel element.

In the above definition of smear density, fissionable nuclear fuel means any material that is capable of undergoing fission including fissile nuclear material and fertile nuclear material but not including non-fuel material. Thus, the smear density is a function or ratio of the amount of fissionable material in a defined area which can be affected by the presence of non-fissionable (non-fuel) material including bonding materials, voids in the fuel element which can contain substantial vacuums, gaseous non-fissionable material, etc. Smear density in the above equation is expressed as a percentage (%); smear density can alternatively be expressed mathematically as a fraction, in which case it is called fractional smear density. In some cases, smear density can vary substantially continuously, such that the smear density at any one location along the longitudinal length may vary from the immediate cross-sectional area adjacent to the smear density being calculated. In some cases it may be appropriate to indicate some sectional or zonal volume averaged smear density with an indication of rate of change of smear density, rather than representing smear density at any one particular cross-sectional area.

FIGS. 2-6 show cross-sectional, schematic views taken along sections A-A to E-E, respectively, of the fuel element 10 shown in FIG. 1A. The cross-sectional views 200, 300, 400, 500, 600 are perpendicular to the longitudinal axis 20 of the fuel element 10 and schematically illustrate an example distribution of fissionable composition which is shown as pellets. The interstitial spacing between pellets can optionally contain non-fuel material such as bonding material, a substantial vacuum, gaseous materials, or any suitable material. The cross-sectional views also graphically illustrate the area of fissionable nuclear fuel in a cross-section of the tubular fuel element perpendicular to the longitudinal axis and the total area of the interior volume in the cross-section of the tubular fuel element that can be used to determine the ratio of these two areas that varies with position along the longitudinal axis. The ratio, which can be expressed as a smear density, at each of the five indicated locations along the longitudinal axis 20 of the fuel element 10 are shown in the noted figures. For illustrative purposes, sections A-A and E-E are located toward longitudinal ends of the tubular fuel element and section C-C is located proximate the longitudinal center of the tubular fuel element; sections B-B and D-D are located approximately midway between the respective longitudinal end section and the longitudinal center section. The use of five sections is illustrative and non-limiting and a tubular fuel element can have an increasingly large number of cross-sections having discrete ratios (or smear densities) as the locations along the longitudinal axis are parsed to thinner and thinner sections, which in the aggregate produce a step-wise varying or substantially continuously varying change in the ratio along the longitudinal axis.

Figure 7:
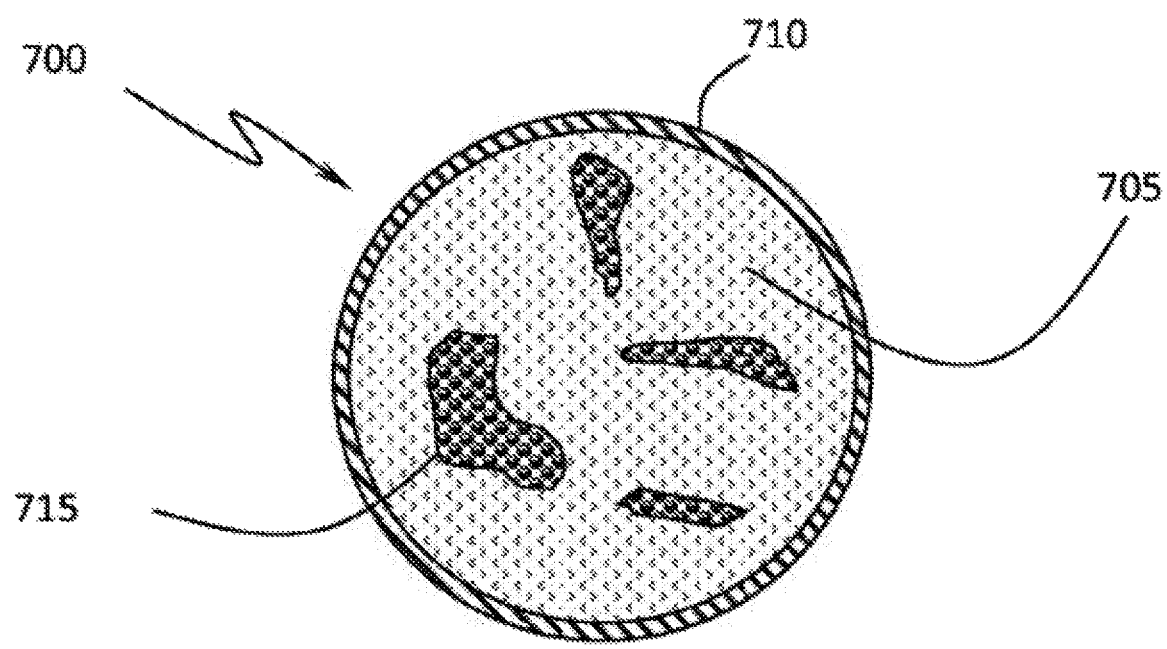
FIG. 7 is a cross-sectional schematic view of an example embodiment of a fuel pellet.

In the schematic views in FIGS. 2-6, the fissionable composition including the fissionable nuclear fuel is formed as pellets. FIG. 7 is a cross-sectional schematic view of an example embodiment of a fuel pellet 700. The fuel pellet 700 includes a fissionable composition 705 including fissionable nuclear fuel. The fissionable composition of the fuel pellet can optionally contain non-fuel material. The fuel pellet 700 can optionally include one or more of an outer coating 710 and/or filler material 715. The outer coating may be any suitable material and in some cases may include a material to limit diffusion or interaction between the fuel composition and either or both the coolant, the cladding, etc. Example outer coating materials are described further below with reference to liners of the cladding. The filler material (as a form of non-fuel material) differs from the fissionable nuclear fuel. The filler material can fill a void space in a structure of the fuel material and/or be distributed or intermixed with the fuel material and can include a gas, liquid, solid, vacuum, bonding material, neutronic poison, or any suitable non-fuel material for the nuclear fuel element.

Returning to the cross-sectional views in FIGS. 2-6, a plurality of fuel pellets 210, 310, 410, 510, 610 are distributed in the interior volume of the tubular fuel element. The fuel pellets are in thermal contact with each other and with the interior surface of the cladding. Interstices formed between the pellets and between the pellets and the cladding provide a volume to accommodate, at least initially, fission products and, in particular, fission products in the form of gas, that form during irradiation. As a result, the interstices contribute to reduce mechanical forces, in particular tensile forces, exerted on the cladding.

The fuel pellets are in heat transfer contact with the cladding. For example, a mechanical contact bond allows heat generated from nuclear reactions to be transferred to the cladding, primarily by conduction either directly or through non-fuel materials. Additionally or alternatively, a medium, such as a solid or fluid (including for example liquid metal or a gas), can be located in the spaces and can provide an additional conduction path for heat transfer from the pellet to the cladding via a solid or even a fluid such as a liquid metal bond or gas bond.

In additional or alternative embodiments, the fuel element cladding can include a liner on the interior surface of the cladding which separates the fuel (whether in pellet form, sponge form or other form) from the outer cladding material. In some cases, particularly at high burn-ups, the contents of the fuel and the cladding may tend to diffuse, thereby causing undesirable alloying and/or degrading the material of the fuel and the cladding (e.g., by de-alloying of the contents of the fuel and/or cladding layer or forming a new alloy with degraded mechanical properties). A liner may serve as a barrier layer between the fuel and the cladding material to mitigate such interatomic diffusion. For example, one or more liners of the cladding may be employed to mitigate interatomic diffusion between the elements in the fissionable composition of the fuel and the cladding material to avoid, for example, degradation of the fuel and/or cladding material. The liner may contain one layer or multiple layers. In the case where the liner contains multiple layers, these layers may contain the same or different materials and/or have the same or different properties. For example, in one embodiment, at least some of the layers may include the same material while some include different materials.

In one example, the outer cladding material may comprise at least one material chosen from a metal, a metal alloy, and a ceramic. In one embodiment, the cladding may contain a refractory material, such as a refractory metal including at least one element chosen from Nb, Mo, Ta, W, Re, Zr, V, Ti, Cr, Ru, Rh, Os, Ir, Nd, and Hf. A metal alloy in a cladding layer may be, for example, steel. The steel may be chosen from a martensitic steel, an austenitic steel, a ferritic steel, an oxide-dispersed steel, T91 steel, T92 steel, HT9 steel, 316 steel, and 304 steel. The steel may have any type of microstructure. For example, the steel may include at least one of a martensite phase, a ferrite phase, and an austenite phase. The cladding may include a first liner adjacent to the outer cladding material and may comprise a material selected to reduce interatomic diffusion and/or interaction with the outer cladding and a second liner. The second liner, adjacent to the first liner and forming the interior surface for containing the fuel composition, may comprise a material selected to reduce interatomic diffusion or interaction with the first liner and the fuel composition. An example of a suitable material for use as a liner includes one or more alloys including Nb, Mo, Ta, W, Re, Zr, V, Ti, Cr, Ru, Rh, Os, Ir, Nd and Hf. The liner of the cladding may be deposited on the interior surface of the outer cladding material, may be deposited on the outer, cladding facing surface of the fuel composition, and/or may be a layer of material disposed between the outer cladding material and the fuel composition and/or in any suitable manner.

In the three-dimensional fuel element, the plurality of fuel pellets occupy at least a portion of the interior volume defined by the cladding. However, in the two-dimensional cross-sectional views in FIGS. 2-6, the plurality of fuel pellets 210, 310, 410, 510, 610 occupy a portion of the interior area defined by the inner surfaces 220, 320, 420, 520, 620 of the walls 230, 330, 430, 530, 630 that constitute the cladding 240, 340, 440, 540, 640 and an interstitial space 250, 350, 450, 550, 650 is formed between the fuel pellets themselves and between the fuel pellets and the inner surface of the cladding. Typically, the interstitial space can be occupied by a non-fuel material such as a bonding and/or cooling material, such as a solid or fluid which in some cases may comprise a liquid metal or a gas forming, respectively, a liquid metal bond or a gas bond. A further characteristic of the illustrated fuel element is that there is thermal conduction contact (one form of thermal transfer) between at least some of the fuel pellets 210, 310, 410, 510, 610 and walls 230, 330, 430, 530, 630 both directly by fuel pellet to cladding (or fuel pellet to liner) contact as well as indirectly through the bonding material in the spaces 250, 350, 450, 550, 650.

In any one cross-sectional view, the portion of the area occupied by the fissionable material of the plurality of fuel pellets 210, 310, 410, 510, 610 is the value for $Area_{Fuel}$ in the smear density equation and the area defined by the inner surfaces 230, 330, 430, 530, 630 of the walls 240, 340, 440, 540, 640 that constitute the cladding 250, 350, 450, 550, 650 is the value for $Area_{Interior\ Cross-Section}$ in the smear density equation. If a liner is present in the cladding, then the value for $Area_{Interior\ Cross-Section}$ is determined using the innermost surface of the liner, i.e., the surface exposed to the interior volume.

The ratio of area of fissionable nuclear fuel in a cross-section of the tubular fuel element perpendicular to the longitudinal axis to area of the interior of the cladding in the cross-section of the tubular fuel element can vary with position along the longitudinal axis by any suitable means and can be selectively designed or formed based on the presence and amount of any non-fissionable material including any one or more of the interstitial spaces between the fuel pellets, voids within the pellets, other non-fuel material in the pellet, etc. or in any other suitable manner.

For example, the longitudinal variation can be achieved by varying the fuel loading of the fissionable composition. The fissionable composition, such as in each pellet, can vary (by, for example, varying the relative amounts of one or more of fissionable material and non-fuel material). The non-fuel material includes one or more of interstitial spaces, voids within the fuel composition, filler material, bonding material, coolant, etc. In this example, the amount of non-fuel material within the fuel composition can be selectively varied to achieve the desired fuel loading. The pellets of varying composition can then be disposed longitudinally in the tubular fuel element to establish the desired longitudinal variation in the ratio (or smear density).

In an alternative or additional example, the longitudinal variation can be achieved by varying the size of the bodies containing the fissionable composition. The geometric size of the fuel pellet (or other body shape of the fissionable composition) can change and can take the form of any one or more of powders, particulates, slugs, etc. The size and shape of the pellet may be designed and manufactured based on the desired smear density including designing both the volume and cross-sectional area of fissionable material and non-fuel material including voids within the pellet, interstitial spaces between the pellets, fuel loading, etc. given the fuel element cladding interior volume, shape and size. Such pellets can then be loaded at a higher or lower cross-sectional density at longitudinal locations in the tubular fuel element to establish the desired longitudinal variation in the ratio (or smear density). Also, depending on shape of the pellet, larger pellets may reduce the loading density as a result of the contact between pellets leaving a larger area or a smaller area for the interstitial space between the pellets. In this regard, at a close packed density for a given spherical pellet size, a smaller spherical size will have smaller spaces between contacting pellets than for a larger spherical size.

As an alternative or additional example, a mixture of sizes and/or shapes can further selectively reduce the spaces between contacting pellets as a result of suitably sized smaller pellets occupying the spaces between contacting larger pellets. Compacting or settling of the pellets (whether of the same or different sizes and/or shapes) within the cladding can be accomplished through any suitable method including, but not limited to, mechanical (including tamping, pressure, air blowing), vibration, etc.

In additional or alternative examples, non-fuel material may be intermixed or distributed with the fissionable material within the fuel pellet and/or non-fuel material may be provided in separate pellets. The non-fuel material pellets may be intermixed with the fissionable composition pellets to provide the desired smear density for that particular location along the longitudinal length of the fuel element. Additionally or alternatively, voids (whether filled with vacuum or other nonfuel material) within the fuel pellets can provide a mechanism to vary fuel loading in the fuel element.

In a further example, the longitudinal variation can be achieved by distributing the pellets in a medium. A structure or material in the fuel element can provide a medium for distribution of the pellets or other bodies containing the fissionable composition. A sufficiently dense bonding material or non-gaseous bonding material can be used to fill the space between pellets. Such a bonding material can be used in suitable quantity to vary the distance between pellets (and between pellets and the inner surfaces of the walls) and thereby obtain a higher or lower cross-sectional density at longitudinal locations in the tubular fuel element to establish the desired longitudinal variation in the ratio (or smear density).

Any of the above methods or combinations of one or more of the above methods to achieve the variation can be used to achieve different and/or more complex gradations in the longitudinal distribution of the ratio or smear density. For example, varying the fuel loading of the pellet can be combined with varying the size of the bodies containing the fissionable composition.

FIGS. 2-6 schematically present one example in which smear density can vary with position along the longitudinal axis within a single fuel element, e.g., fuel element 10 of FIG. 1B. As observable from FIGS. 2-6, the smear density varies across section A-A (FIG. 2), section B-B (FIG. 3), section C-C (FIG. 4), Section D-D (FIG. 5) and section E-E (FIG. 6) and is illustrative of the ratio (or smear density) varying with position along the longitudinal axis of the fuel element. Overall, in example embodiments, the smear density can vary with position along the axis between a minimum of 30%, alternatively 50%, and a maximum of 100%, alternatively 75% or 70%.

As an additional or alternative modification, the smear density at each longitudinal end of the tubular fuel element can be greater than the smear density at a longitudinal center of the tubular fuel element. FIGS. 2-6 illustrate such an example embodiment in that comparing FIG. 2 (a cross-sectional view at a first longitudinal end) and FIG. 6 (a cross-sectional view at a second longitudinal end) with FIG. 4 (a cross-sectional view at a longitudinal center), one can readily ascertain that the area occupied by the fuel pellets 210, 610 at the first longitudinal end and second longitudinal end is greater than the area occupied by the fuel pellets 410 at a longitudinal center.

In an additional modification, the smear density at a first longitudinal end of the tubular fuel element is greater than the smear density at a second longitudinal end of the tubular fuel element. FIGS. 2-6 also illustrate this example embodiment in that comparing FIG. 2 (a cross-sectional view at a first longitudinal end) with FIG. 6 (a cross-sectional view at a second longitudinal end), one can ascertain that the area occupied by the fuel pellets 210 at the first longitudinal end is greater than the area occupied by the fuel pellets 610 at the second longitudinal end.

Figure 8:
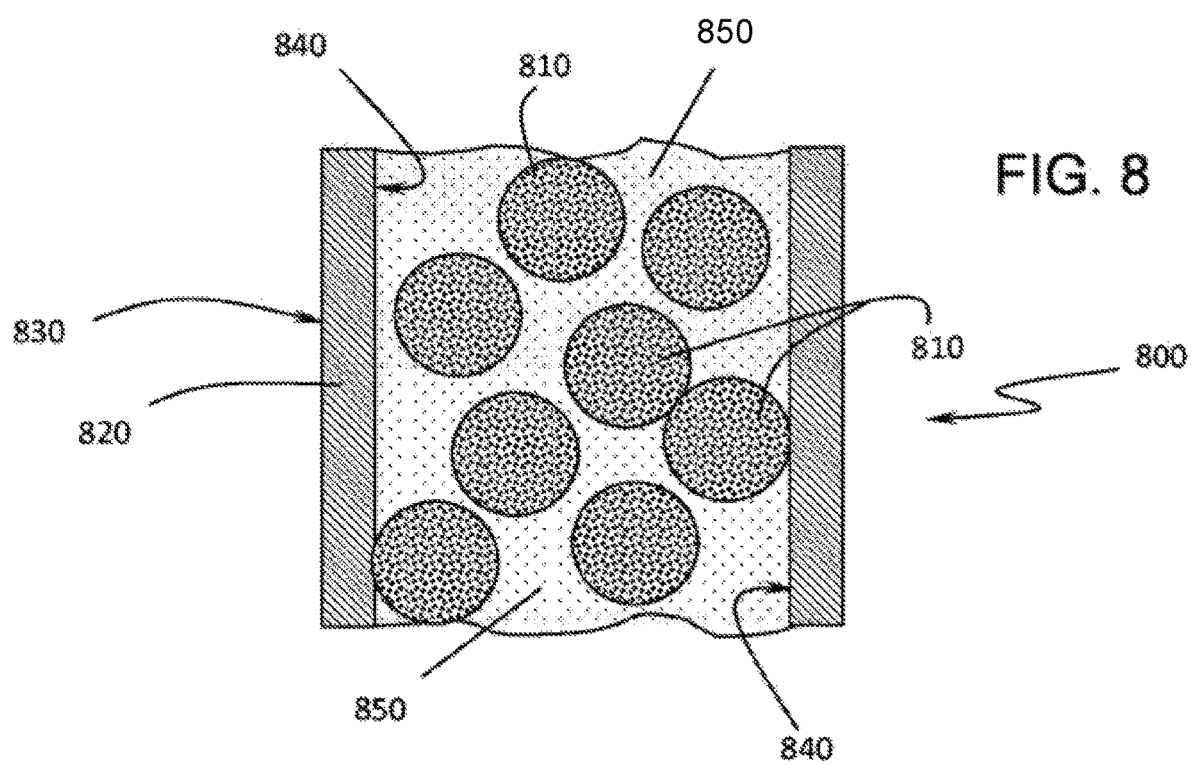
FIG. 8 is a cross-sectional schematic view of a portion of a first example fuel element in which the density of fuel pellets is varied along the longitudinal length.
Figure 9:
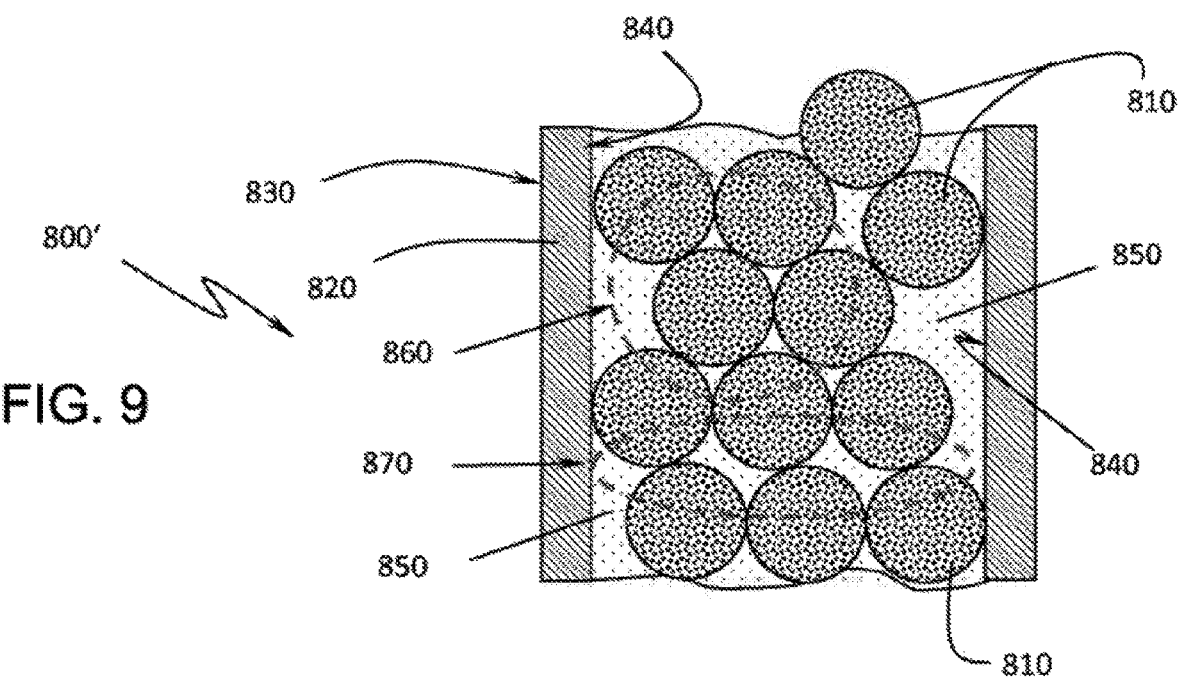
FIG. 9 is a cross-sectional schematic view of a portion of a second example fuel element in which the density of fuel pellets is varied along the longitudinal length.
Figure 10:
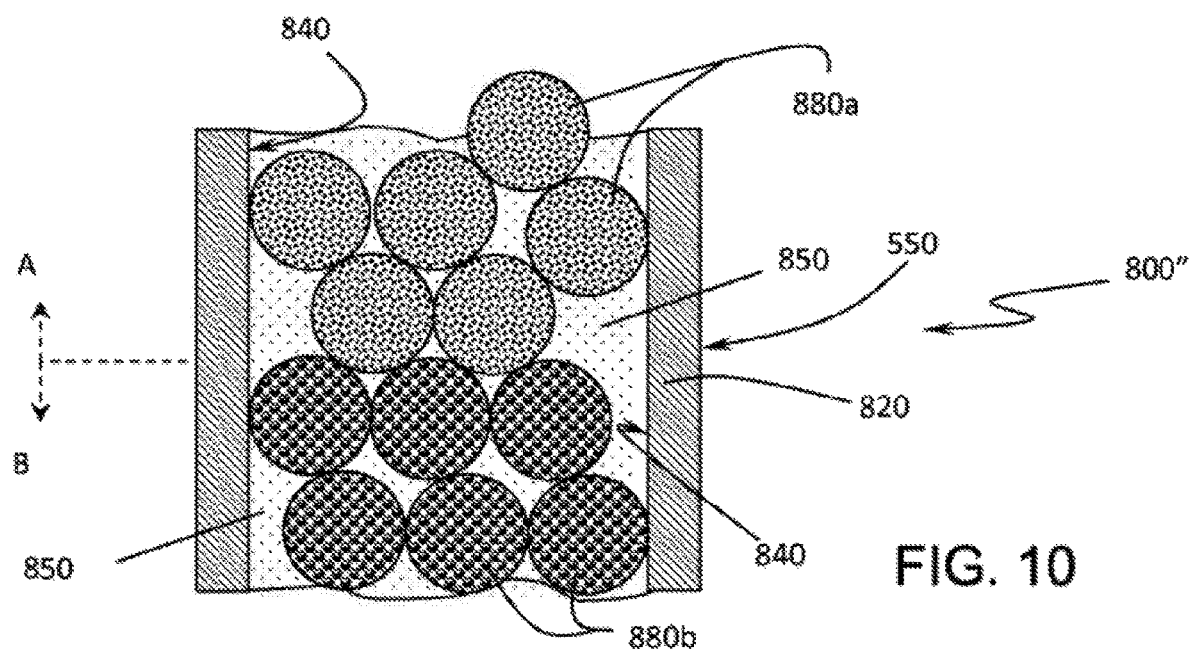
FIG. 10 schematically illustrates an example embodiment of a fuel element with fuel pellets of different fissionable nuclear fuel loading located in different strata of the interior volume to form quantized zones along the longitudinal length of the fuel element.

FIGS. 8-10 illustrate, in a side cross-sectional view of a portion of the fuel element, variation of the density of fuel pellets (fuel pellets per volume) along the longitudinal length of the fuel element by changing the relative amount of fuel pellets (and their corresponding amount of fuel composition with optional non-fuel materials) and non-fuel components (whether bond material, voids, or other non-fissionable material) used to fill the interior volume during the manufacturing of the fuel element. In the cross-sectional schematic views, fuel pellets 810 are located within the interior volume of the fuel element 800 between walls 820 of the cladding 830. To achieve a lower smear density, the fuel pellets can be distributed within the interior volume with the majority of fuel pellets being discrete fuel pellets (meaning that the fuel pellet does not directly, mechanically contact another fuel pellet) although some fuel pellets can be in contact with other fuel pellets, as seen in FIG. 8. Also as seen in FIG. 8, fuel pellets 810 may either be in contact with the interior surfaces 840 of the walls 820 or be at a distance from the interior surfaces 840 of the walls 820 or a mixture of such positioning. A bond material 850, such as helium gas or liquid sodium or solid, and/or any other suitable non-fuel material are located in the space surrounding and between fuel pellets 810 and is located between fuel pellets 810 and the interior surfaces 840 of the walls 820. The bond material can provide, at least in part, thermal transfer contact between the fuel pellets and the cladding.

To achieve a higher smear density, the fuel pellets can be distributed within the interior volume with a higher proportion of fuel regions to non-fuel regions. For example, the majority of fuel pellets or alternatively all of the fuel pellets can be in contact with an adjacent fuel pellet, although there can be some spaces separating adjacent fuel pellets to accommodate the packing arrangement of the fuel pellets within the interior volume, as seen in the fuel element 800' in FIG. 9. Also as seen in FIG. 9, fuel pellets 810 may be in contact with the interior surfaces 840 of the walls 820 although some fuel pellets 810 may be at a distance from the interior surfaces 840 of the walls 820 and there is a mixture of such positioning. Contact between adjacent fuel pellets 810 can be promoted by, for example, vibrational techniques, mechanical techniques (such as tamping, fluid flow, etc.), although packed fuel pellets are not necessarily in a close-packing arrangement. In FIG. 9, contact between adjacent fuel pellets in a first area 860 is in close-packing arrangement and contact between adjacent fuel pellets in a second area 870 is in packed, but not in close-packing arrangement. A bond material 850 which can be any suitable solid or fluid bonding material such as a liquid metal cooling media, such as liquid sodium, is located in the space surrounding and between fuel pellets 810 and is located between fuel pellets 810 and the interior surfaces 840 of the walls 820.

In some cases, the size and/or shape of the fuel pellet and/or non-fuel material pellet may be selected to ensure regular, predictable fitting within the given dimension (size and shape) of the cladding interior. For example, some spherical and/or regular polygons may have a predictable and selected nesting or structure when introduced to or disposed within the interior of the cladding, such as that illustrated in FIG. 10.

In an additional or alternative example, the amount of fissionable nuclear fuel per unit volume area, i.e., the fissionable nuclear fuel loading, can vary and the longitudinal variation in smear density can be achieved by using pellets of higher or lower fissionable nuclear fuel loading. The fissionable nuclear fuel loading can be determined and selected to vary longitudinally along the length of the fuel element on a quantized basis or on a continuous basis, depending on the manner in which pellets of different fissionable nuclear fuel loading were manufactured. Using such pellets, a variation in smear density can be achieved by placing fuel pellets with different fissionable nuclear fuel loading in different locations or zones along the longitudinal length of the fuel element. For example, pellets with higher fissionable nuclear fuel loading can be located at longitudinal locations which are to have higher smear densities and pellets with lower fissionable nuclear fuel loading can be located at longitudinal locations which are to have lower smear densities. FIG. 10 schematically illustrates another embodiment of a fuel element 800" with fuel pellets 880a, 880b of different fissionable nuclear fuel loading that have been located in different strata of the interior volume to thereby form quantized zones A, B along the longitudinal length of the fuel element. In the FIG. 10 embodiment, fuel pellets 880a have a lower fissionable nuclear fuel loading than fuel pellets 880b and zone A has a lower smear density than zone B.

Figure 11A:
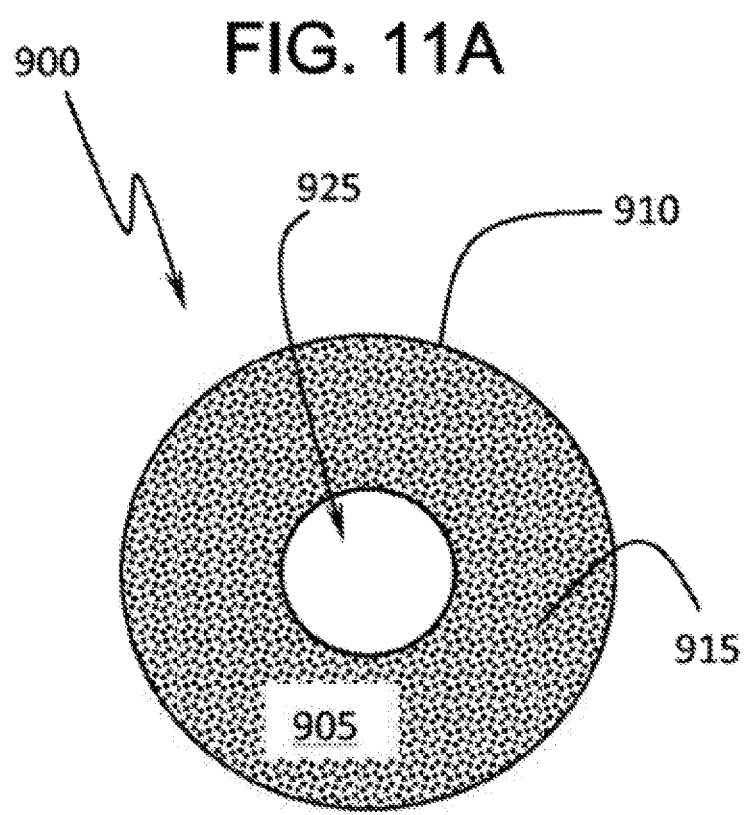
FIGS. 11A-B and FIGS. 12A-B illustrate volumetric shapes with example characteristics that can be included, individually or in combination, in embodiments of annular slugs that contain fissionable composition within the body of the annular slug.
Figure 11B:
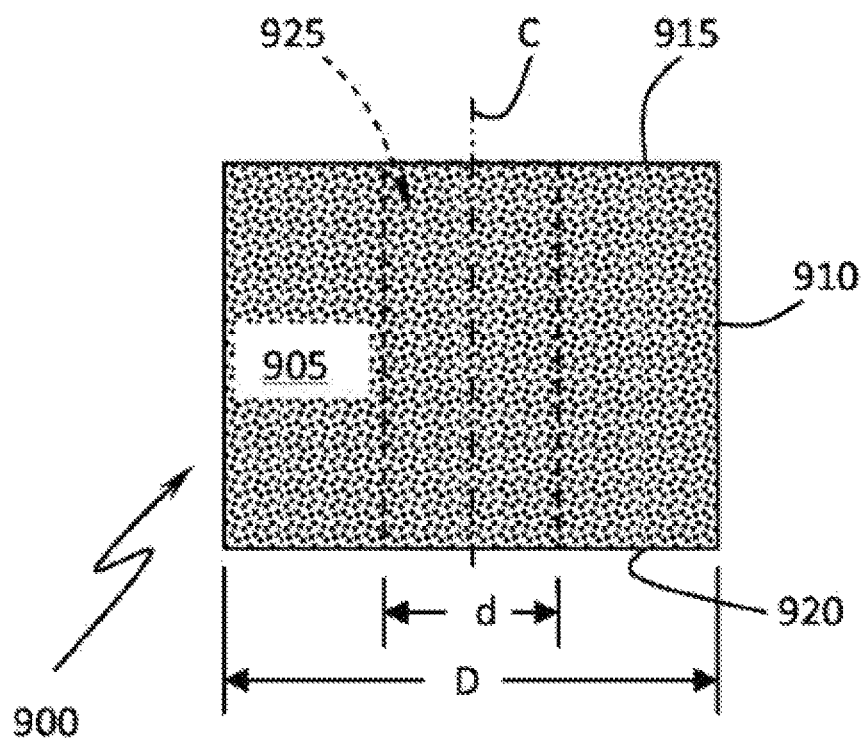

Although described herein is some instances as a pellet, a pellet is not limited to a spherical geometric shape, but can be any volumetric shape including oblong, ovoid, cylindrical, rod-like, conical, rectilinear or any other closed, volumetric shape as long as the fissionable composition in each such geometric shape can be quantified and, if desired, selectively modified to any suitable shape. For example and in additional or alternative embodiments, the fissionable composition may be contained within a body having the shape of an annular slug. FIGS. 11A and 11B illustrate such a shape in a top view (FIG. 11A) looking along the longitudinal axis and in a side view (FIG. 11B) looking along a radial axis. The annular slug 900 includes a body 905 having outer walls 910 connecting longitudinally separated top surface 915 and bottom surface 920. The annular slug 900 has a center passage 925 from the top surface 915 to the bottom surface 920.

Figure 12A:
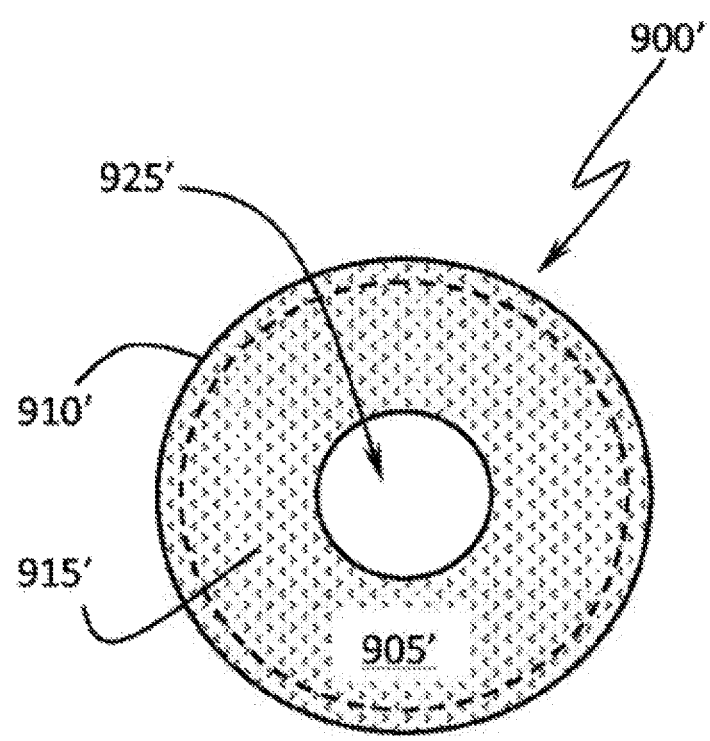
Figure 12B:
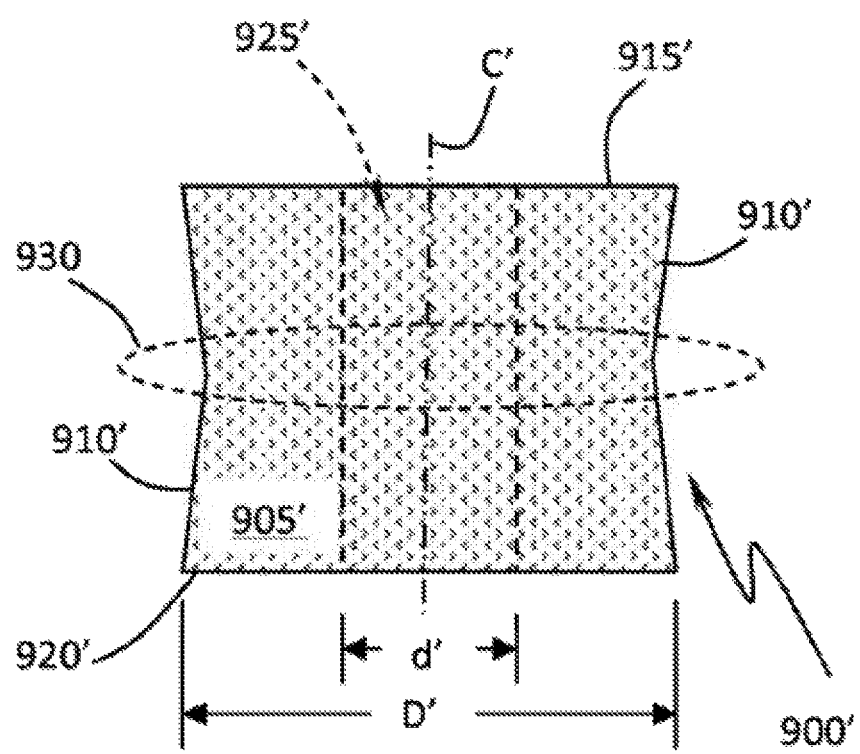

In the embodiment shown in FIGS. 11A-B, the diameter of the outer walls is substantially constant along the longitudinal length and the amount of fissionable material along the longitudinal length may be varied in any suitable manner by varying fuel loading, amount of non-fuel material, and/or adjusting voids or interstitial spacing. In additional or alternative embodiments, such as shown in FIGS. 12A and 12B, the diameter of the outer walls can vary. FIGS. 12A and 12B show one option for varying the outer wall of the body. In FIGS. 12A and 12B, the outer wall 910' of the body 905' of the annular slug 900' has, relative to the longitudinal center C', a diameter D' that decreases as the outer wall 910' extends longitudinally from the top surface 915' and bottom surface 920' toward a middle region 930. Such outer walls 910' can be linear or have a concavity or convexity or have a combination of such surfaces. In addition, the outer walls 910' with decreasing diameter D' in the middle region 930 can impart a shape to the body 905' along the longitudinal length of each slug. For example, the body may have an exterior surface with a reduced central diameter in a central portion compared to a first diameter of the body at a first end portion and compared to a second diameter at a second end portion. Such a shape can, in some embodiments, be the shape of a hyperboloid or of a hyperbolic paraboloid. In additional or alternative examples, the exterior surface can vary not only along the longitudinal length of each body but, additionally or alternatively, the composite effect of multiple slugs arranged in the fuel element can impart such a shape along the longitudinal length of the fuel element. Variation of the diameter or width of the fissionable material in the slug provides another mechanism of varying fissionable material fuel loading along the longitudinal length of the fuel element by utilizing slugs of varying shapes selectively located along the longitudinal length of the fuel element to impart a desired shape, such as the shape of a hyperboloid or of a hyperbolic paraboloid.

Although the passages 925, 925' shown in FIGS. 11A-B and 12A-B are cylindrical and located symmetrically about the longitudinal axis of the body, the passage can be any suitable shape and located at any position within the body of the annular slug, either disposed off-center of the longitudinal axis in a radial direction, disposed as multiple passages, and/or disposed in some longitudinal volume of the slug and not present in other longitudinal volumes of the slug. It is to be appreciated that any one or more of the preceding may be used as appropriate. Additionally or alternatively, the radius of the passage 925, 925' can vary similarly and/or differently from the outer wall 910, 910' of the slug.

The fissionable composition is disposed within the body 905,905' of the annular slug 900,900' and may be of uniform composition throughout the body 905,905' or can vary in either or both the longitudinal and radial directions. Multiple annular slugs 900,900' can be positioned, e.g., stacked, in the interior volume of the tubular fuel element. The passages 925, 925' of the slugs 900, 900' when stacked into a fuel element can be selectively aligned or misaligned as may be appropriate. The dimensions of the diameter (D,D') of the outer diameter walls and the dimensions of the diameter (d,d') of the passage can vary. Further, varying one or more of these dimensions varies the volume of the body of the slug and, by varying the volume amongst a plurality of slugs in a tubular fuel element, such variation in body volume can be used to adjust the fuel loading for at least a portion or all of the desired longitudinal variation in the ratio (or smear density). Alternatively or additionally, the longitudinal variation in the ratio (or smear density) can be established by varying the composition within one or more bodies or by varying the dimensions of the diameters (D,d or D',d') in one or more bodies. Although the slugs shown in FIGS. 11A-B and 12A-B show the ends of the slugs as substantially perpendicular to the longitudinal axis, it is to be appreciated that either or both ends of the slug may be non-perpendicular to the longitudinal axis, and/or may be any appropriate shape to either selectively fit with adjacent slugs and/or create selected interstitial spaces to selectively adjust the smear density.

Figure 13A:
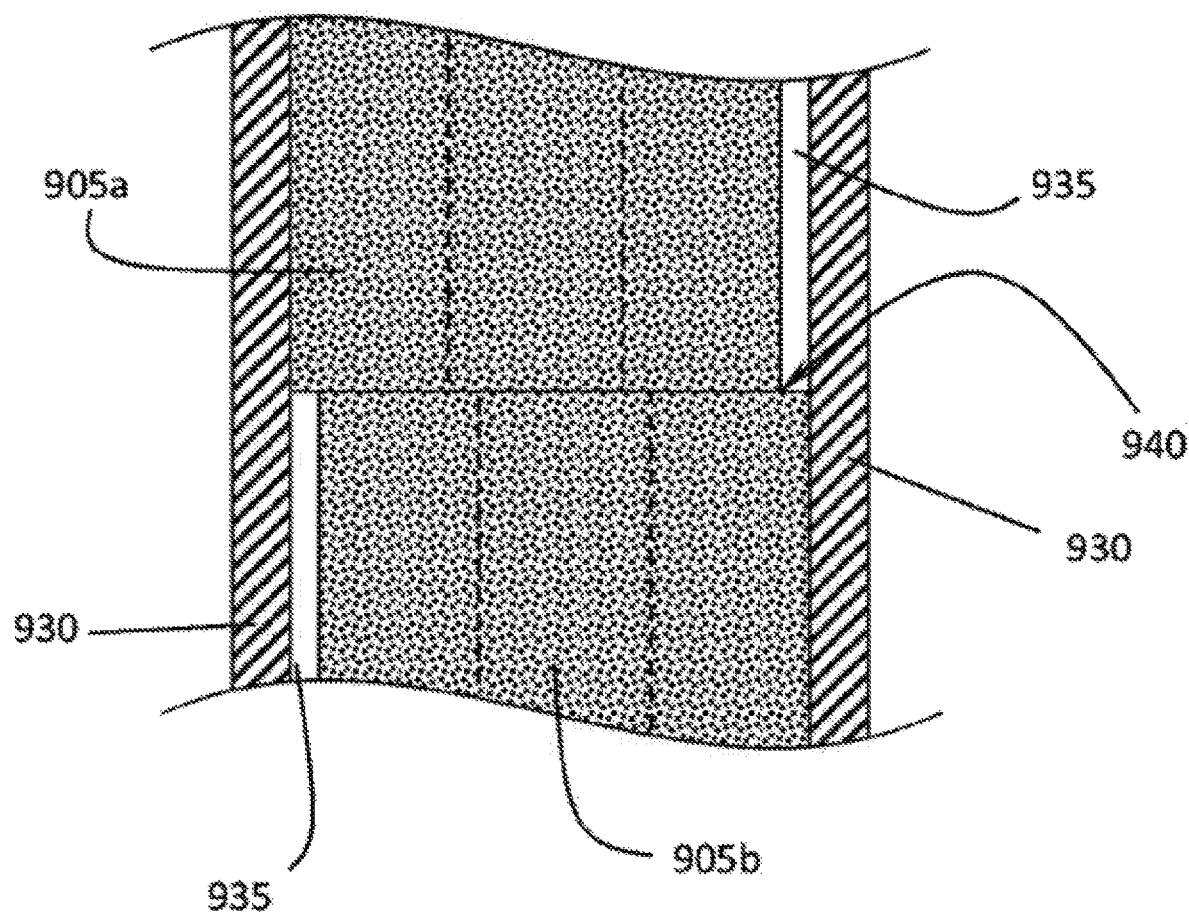
FIGS. 13A-B are schematic cross-sectional views of a fuel element showing annular slugs, such as those in FIGS. 11A-B and FIGS. 12A-B, arranged within walls constituting the cladding.
Figure 13B:
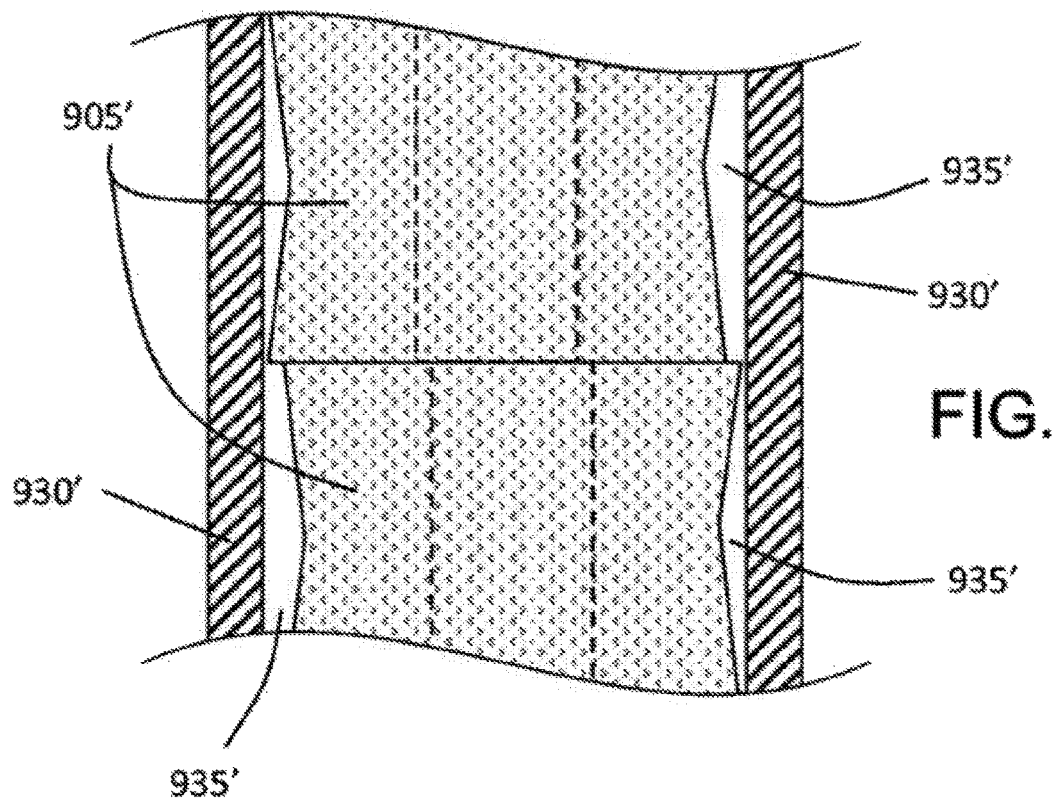
Figure 14:
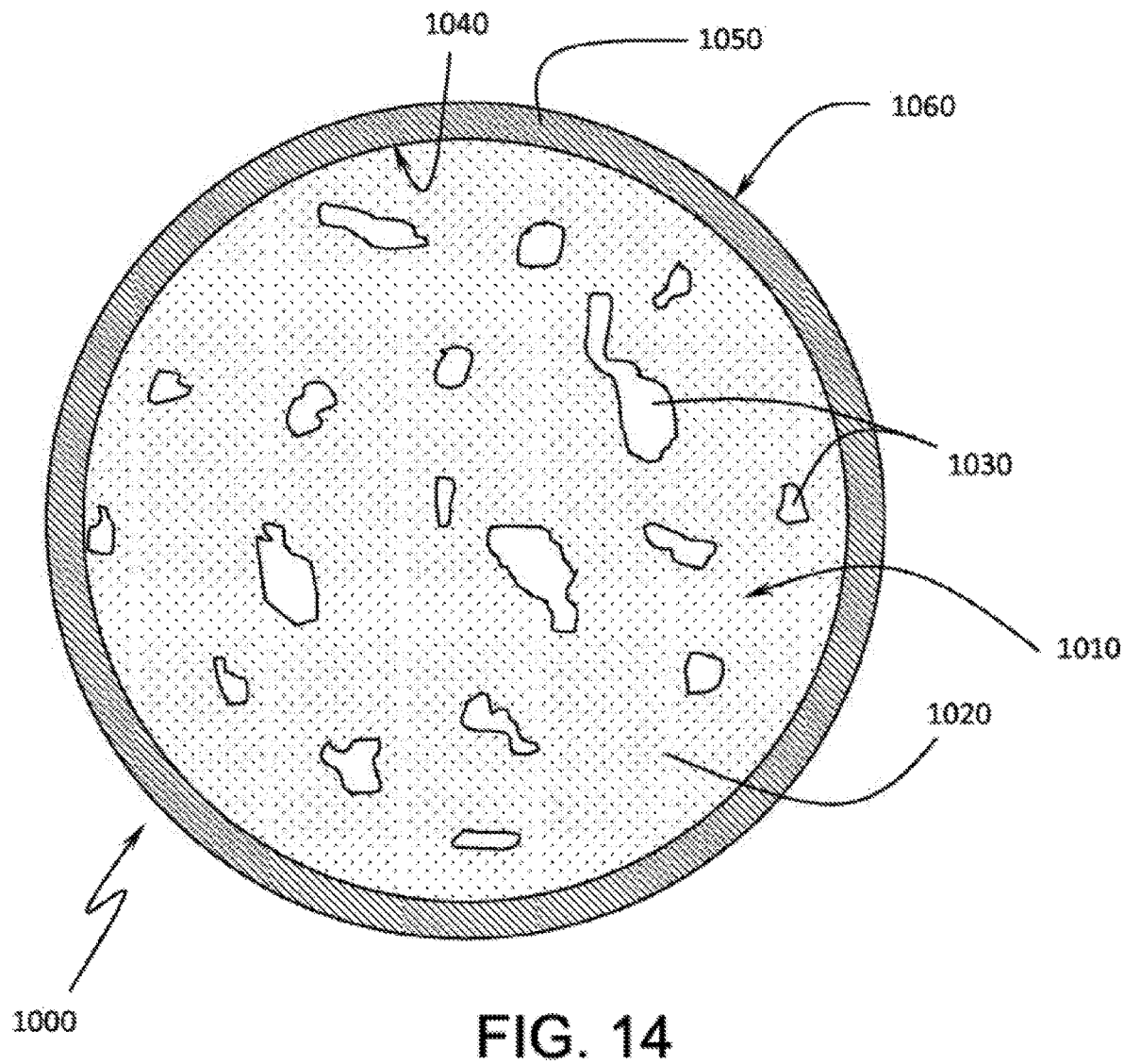
FIGS. 14 to 18 are cross-sectional views taken along sections A'-A', B'-B', C'-C', D'-D' and E'-E', respectively, of the fuel element shown in FIG. 1C.
Figure 15:
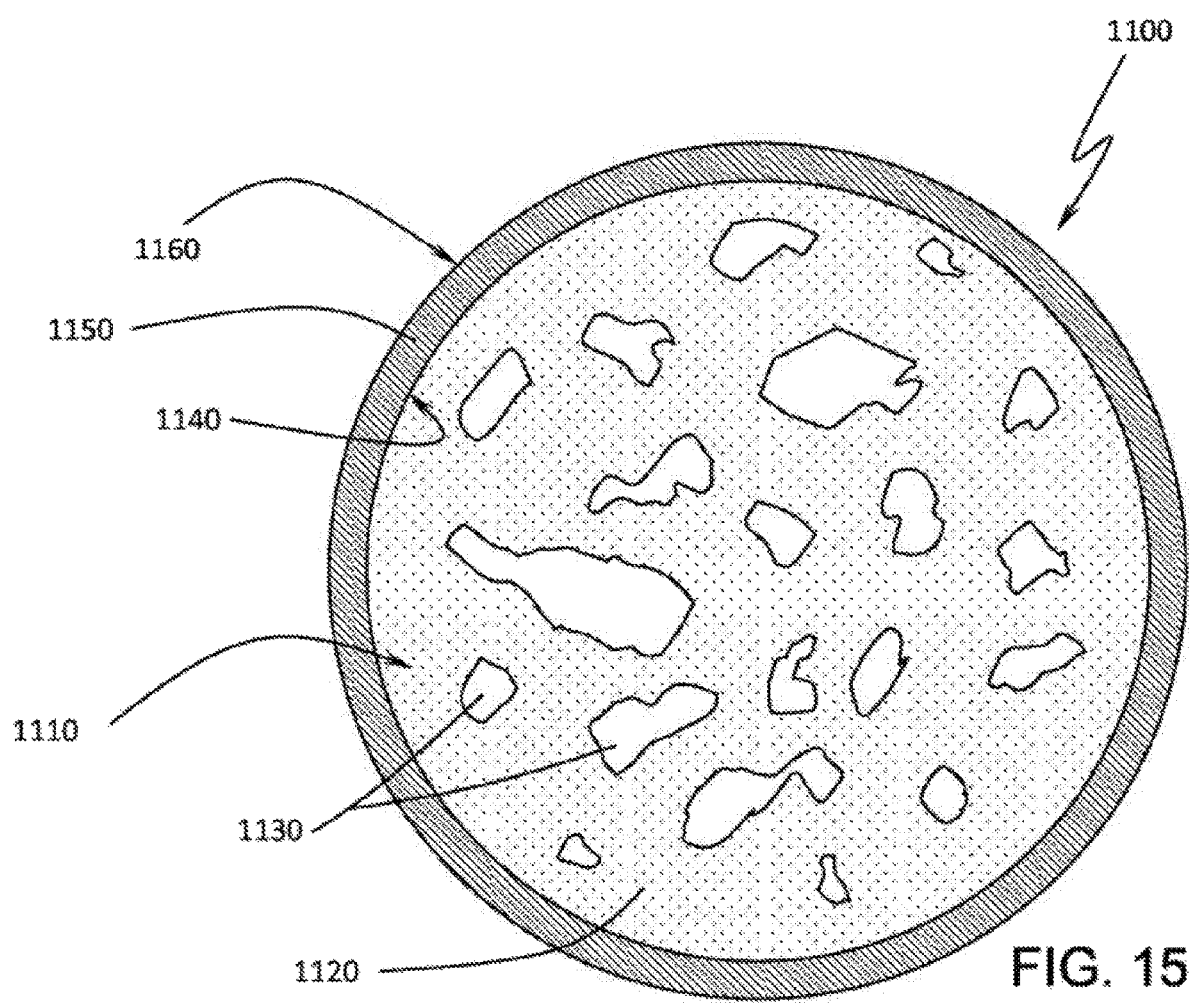
Figure 16:
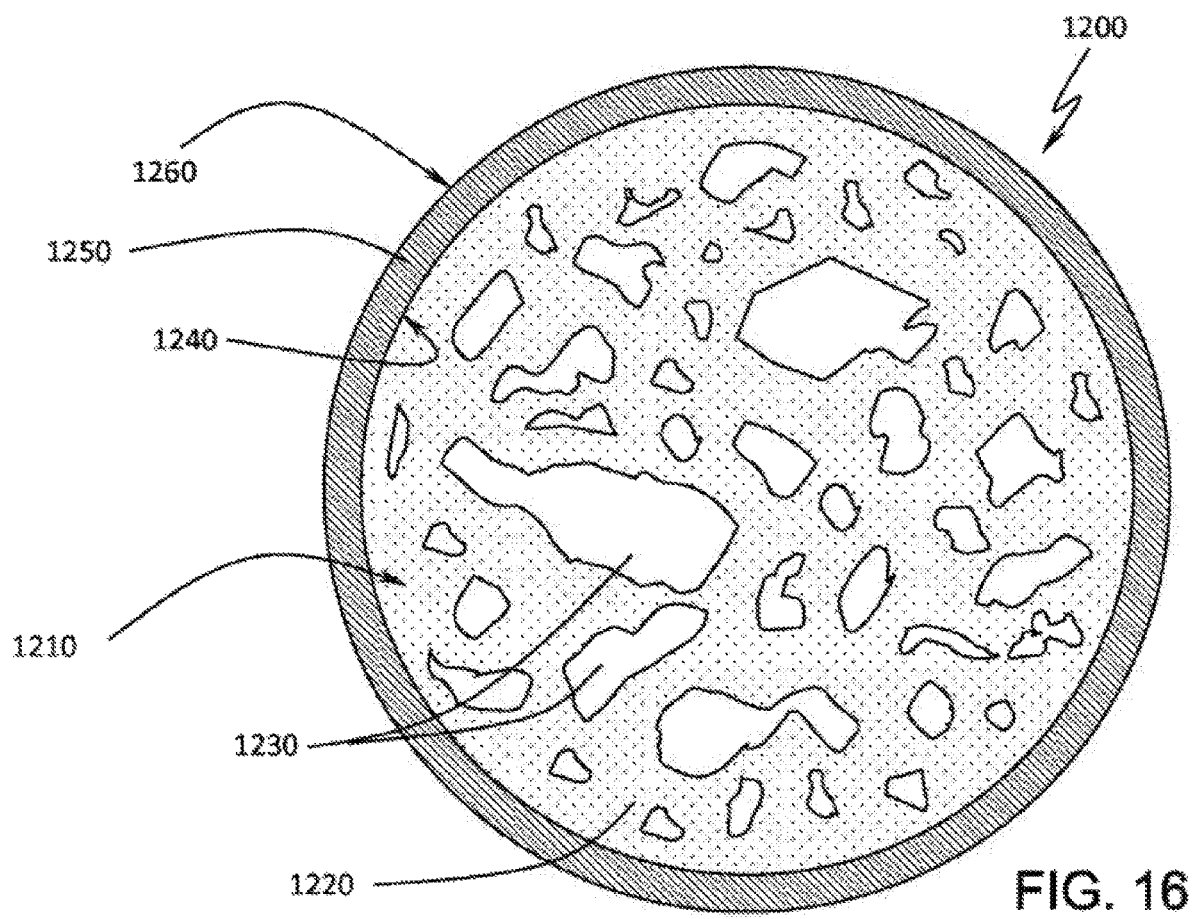
Figure 17:
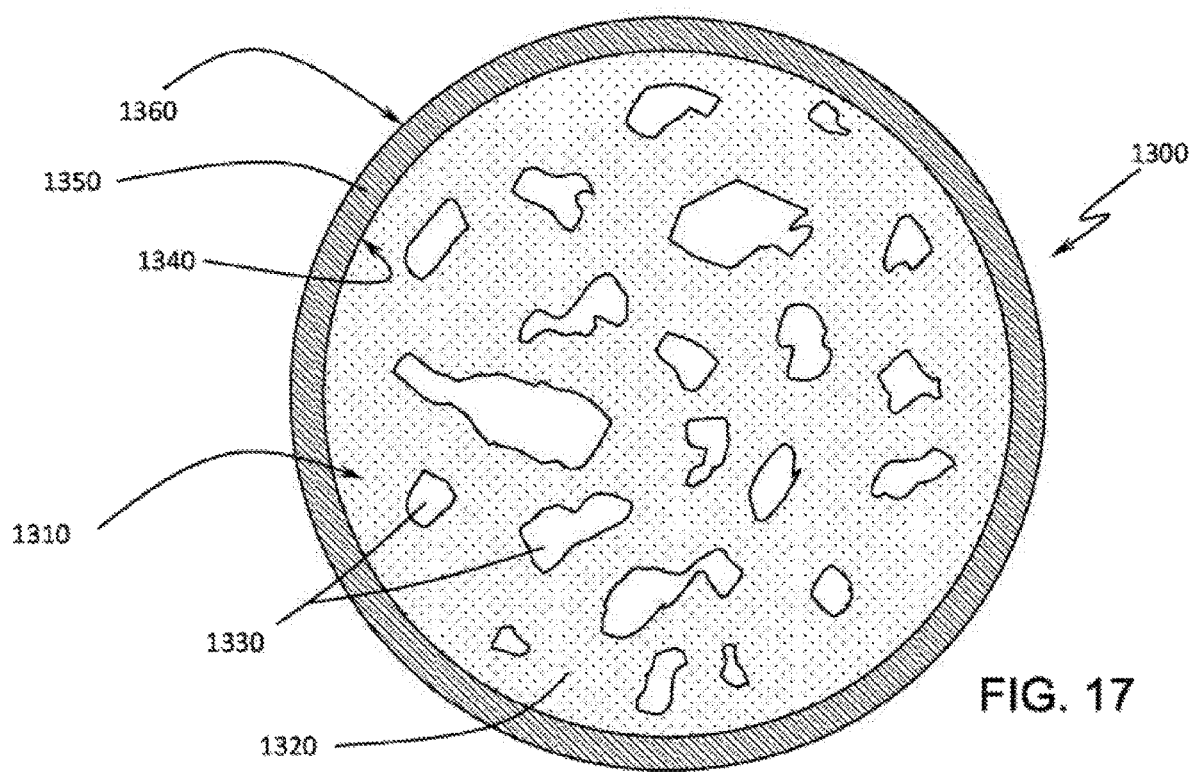
Figure 18:
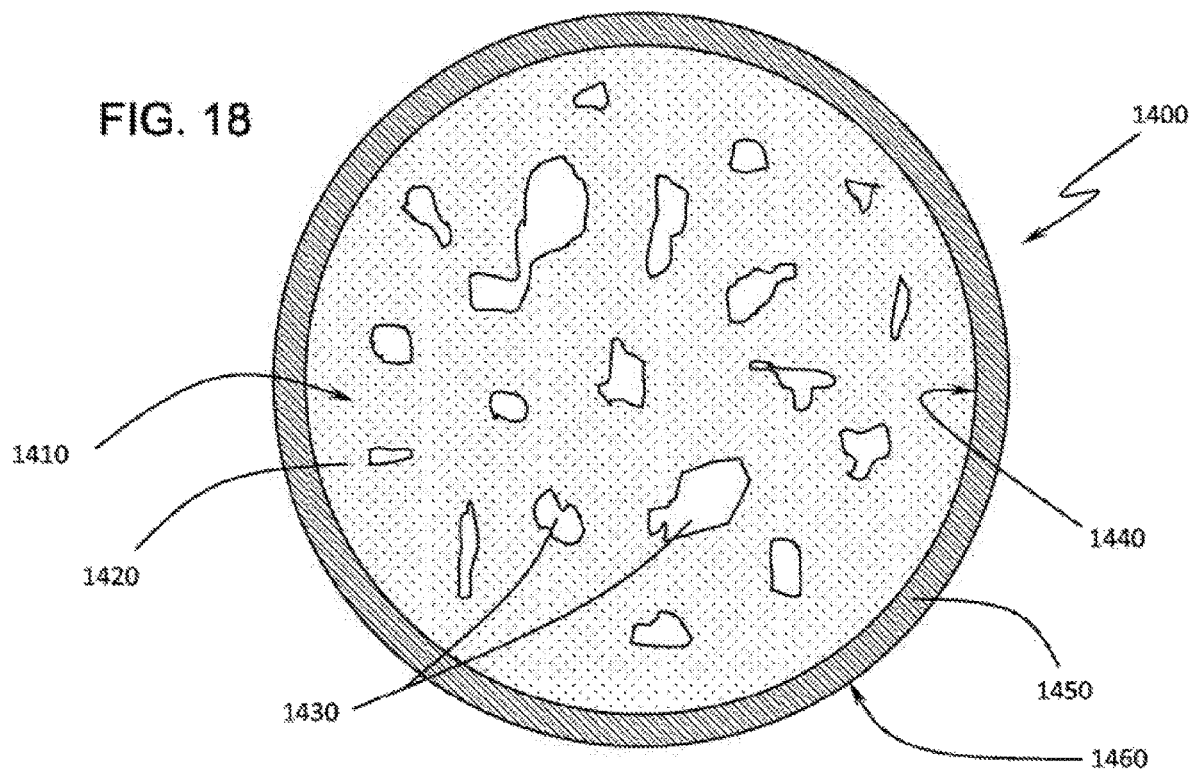

The bodies having the shape of an annular slug can be arranged within the fuel element in any suitable manner. FIGS. 13A-B are schematic cross-sectional views of a portion of a fuel element showing the annular slug bodies, such as those in FIGS. 11A-B and FIGS. 12A-B. In the illustrated embodiment, the bodies 905,905' are in stacked longitudinal relationship within the walls 930,930' of the cladding of the fuel element. One or more gaps 935,935' may be present between the bodies, e.g., the fuel material, and the cladding, though gaps are not required. In some embodiments, the gap is filled with a non-fuel material. In one embodiment the non-fuel material is a pressurized atmosphere, such as a pressurized helium atmosphere; in another embodiment, the gap is filled with a liquid metal, such as sodium.

In some cases, the smear density may differ between different fuel pellets or slugs. Although the following example is discussed with respect to slugs, as a form of pellets, one of skill in the art will recognize that any form of pellet may utilize the below techniques. For example, the smear density of slug 905b of FIG. 13A may be greater than the smear density of slug 905a. In some cases, if the difference between the smear density of adjacent slugs exceeds a smear density difference threshold, an additional amount of strain may occur at or in the region of the point or the plane of contact between the two different slugs (e.g., location 940 in FIG. 13A). In some cases a minimum smear density threshold may be used to limit the different smear densities in adjacent slugs. Alternatively and/or additionally, a localized area of either or both slugs 905a, 905b proximate the other slug may have their smear densities slighter greater (as in the case of smear density of slug 905a) and/or slightly less (as in the example of slug 905b). Additional slugs may be added in between slugs 905a, 905b to affect the alternate smear densities, and/or the smear density within the bodies of either or both slugs 905a, 905b may be locally adjusted either continuously and/or in a segment of the body of the slug proximate the localized contact with the other slug. Such localized adjustment may be used as appropriate to limit the rate of change of the smear densities and/or limit a localized difference between smear densities.

Manufacturing of slugs and/or pellets can be performed in any suitable manner, including any one or more of extrusion, cutting or crushing larger solids forming smaller solids, molding, powder consolidation with or without sintering, removing selected areas of formed materials (such for voids, shape, size, annular passages, etc.) such as by mechanical means for example, drilling, machining, grinding, etc., chemical means, for example, dissolving, reacting, converting, decomposing, etc., or combinations thereof.

FIGS. 14-18 show cross-sectional, schematic views taken along sections A'-A', B'-B', C'-C', D'-D', and E'-E', respectively, of the fuel element 100 shown in FIG. 1C. The cross-sectional views 1000, 1100, 1200, 1300, 1400 are perpendicular to the longitudinal axis 120 of the fuel element 100 and schematically illustrate the distribution of fissionable composition and void space. The cross-sectional views also graphically illustrate the area of fissionable nuclear fuel in a cross-section of the tubular fuel element perpendicular to the longitudinal axis and the total area of the interior volume in the cross-section of the tubular fuel element that can be used to determine the ratio of these two areas that varies with position along the longitudinal axis. The ratio, which can be expressed as a smear density, at each of the five indicated locations along the longitudinal axis 120 of the fuel element 100 is shown in FIGS. 14-18. For illustrative purposes, sections A'-A' and E'-E' are located toward longitudinal ends of the tubular fuel element and section C'-C' is located proximate the longitudinal center of the tubular fuel element; sections B'-B' and D'-D' are located approximately midway between the respective longitudinal end sections and the longitudinal center section. The use of five sections is illustrative and non-limiting and a tubular fuel element can have an increasingly large number of cross-sections having discrete ratios (or smear densities) as the locations along the longitudinal axis are parsed to thinner and thinner sections, which in the aggregate produce a step-wise varying or continuously varying change in the ratio along the longitudinal axis. It is also to be appreciated that the number of sections of similar smear densities may include one or more individual bodies (such as slugs) of similar smear densities; it is also to be appreciated that the plurality of bodies (such as slugs) in a section of similar smear density can achieve the smear density in any single or combination of techniques described above such as any one or more of fuel loading, amount of non-fissionable material, interstitial spaces, voids in the fuel, width of the slug, etc.

In the schematic views in FIGS. 14-18, the fissionable nuclear fuel is in a form of a metal sponge. The metal sponge 1010, 1110, 1210, 1310, 1410 includes a matrix 1020, 1120, 1220, 1320, 1420 of the fissionable nuclear fuel (comprising a fissionable nuclear fuel and a non-fuel material) and a plurality of non-fuel regions 1030, 1130, 1230, 1330, 1430 in the matrix 1020, 1120, 1220, 1320, 1420. The non-fuel regions are typically non-fuel solid material and/or voids that are a substantial vacuum or gas filled, such as with helium. In the three-dimensional fuel element, the metal sponge occupies at least a portion of the interior volume enclosed by the cladding. However, in the two-dimensional cross-sectional views in FIGS. 14-18, the metal sponge 1010, 1110, 1210, 1310, 1410 occupies a portion of the interior area defined by the inner surfaces 1040, 1140, 1240, 1340, 1440 of the wall 1050, 1150, 1250, 1350, 1450 provided by the cladding 1060, 1160, 1260, 1360, 1460. A further characteristic of the illustrated fuel element is that there is thermal conduction contact (one form of thermal transfer) between at least a portion of the metal sponge 1010, 1110, 1210, 1310, 1410 and the wall 1050, 1150, 1250, 1350, 1450 (or with a liner of the cladding or other coating layer, where present). Such thermal conduction contact can be present over greater than 50%, alternatively greater than 70%, greater than 80%, greater than 90% up to 95%, 98% or 99%, of the perimeter of the metal sponge 1010, 1110, 1210, 1310, 1410. Where the metal sponge does not make mechanical contact, the space between the metal sponge 1010, 1110, 1210, 1310, 1410 and the wall 1050, 1150, 1250, 1350, 1450 (or with a liner of the cladding or other coating layer, where present) can be occupied by a non-fuel material such as a liquid metal or a gas forming, respectively, a liquid metal bond or a gas bond. Although FIGS. 14-18 are shown at constant diameter with no annular passage, it is to be appreciated that any one or a combination of these features and other features may be additionally employed with the metal sponge to establish the desired smear density variation along the longitudinal length of the fuel element.

In any one cross-sectional view, the amount of fissionable nuclear fuel material in the fuel composition in the portion of the area occupied by the matrix 1020, 1120, 1220, 1320, 1420 of the metal sponge 1010, 1110, 1210, 1310, 1410 is the value for $Area_{Fuel}$ in the smear density equation and the area defined by the inner surfaces 1040, 1140, 1240, 1340, 1440 of the wall 1050, 1150, 1250, 1350, 1450 formed by the cladding 1060, 1160, 1260, 1360, 1460 is the value for $Area_{Interior\ Cross-Section}$ in the smear density equation. As observable from FIGS. 14-18, the smear density varies between that in any of section A'-A' to section E'-E' and is illustrative of the smear density varying with position along the longitudinal axis of the fuel element.

FIGS. 14-18 also illustrate the modification where the smear density at each longitudinal end of the tubular fuel element is greater than the smear density at a longitudinal center zone of the tubular fuel element. Comparing FIG. 14 (a cross-sectional view at a first longitudinal end) and FIG. 18 (a cross-sectional view at a second longitudinal end) with FIG. 16 (a cross-sectional view at a longitudinal central zone), one can readily ascertain that the area occupied by the matrix 1020, 1420 of fissionable nuclear fuel at the first longitudinal end and second longitudinal end is greater than the area occupied by the matrix 1220 of the fissionable nuclear fuel at a longitudinal center.

In addition, FIGS. 14-18 illustrate the additional or alternative modification where the smear density at a first longitudinal end of the fuel element is greater than the smear density at a second longitudinal end of the fuel element, with both ends having a smear density greater than the central zone. Comparing FIG. 14 (a cross-sectional view at a first longitudinal end) with FIG. 18 (a cross-sectional view at a second longitudinal end), one can readily ascertain that the area occupied by the matrix 1020 of fissionable nuclear fuel at the first longitudinal end is greater than the area occupied by the matrix 1420 of fissionable nuclear fuel at the second longitudinal end.

In embodiments where the fissionable nuclear fuel is located either or both within a matrix of the metal sponge or as part of the metal sponge and located in the interior volume of the fuel element, modifications of smear density can be achieved by suitable means. For example, the metal sponge can be formed with a specified balance of matrix and void in which the matrix has, nominally, a uniform amount of fissionable nuclear fuel. In such a case, a variation in smear density can be achieved by varying the balance between matrix and void space as different sections of the interior volume along the longitudinal length of the fuel element are filled. To achieve a lower smear density, the amount of matrix is reduced and the amount of void is increased. Similarly, to achieve a higher smear density, the amount of matrix is increased and the amount of void is decreased. One manufacturing method to control the relative amounts of matrix and void in a given area is to use a gas injection technique in which matrix material is passed through a blower or other injector and entrains a gaseous medium. The gaseous medium can be an inert gas or a gas that can function as a gas bond. The amount of gaseous medium entrained per a unit volume of matrix can be controlled and adjusted to produce the longitudinal variation in the ratio of area of fissionable nuclear fuel to total area of interior volume. Other manufacturing techniques that can be additionally or alternatively utilized include powder consolidation with a sintering process to consolidate and form interparticle metallurgical bonds (which may be optionally accompanied by an external pressure) and one or more sintering processes can remove portions of the original sintered powder due to differences in melting points, or a powder pack process, molds with void forms, drilling out voids within a preformed solid or foam, hydride/dehydriding and/or a 3D printing process.

Overall, the smear density can vary with position along the axis between a minimum of 30% and a maximum of 75%. Alternatively, the smear density is 50% to 70%. Higher smear density fuel can be used to offset the long term effects of poison on burn-up distribution. Neutron poisons tend to reduce flux while higher smear density fuels breed more fissile fuel and tend to increase flux. In addition, the reactor coolant first entering the nuclear reactor core tends to be cooler (and more dense) than the coolant exiting the reactor core, leading to higher neutronic absorption and lower flux near the coolant entry point (typically at one end of the fuel element) and lower neutronic absorption and higher flux near the coolant exit point (typically at the opposing end of the fuel element). Also, since the coolant exit point is generally at a higher temperature than the coolant entry point, thermal creep and other temperature effects on the fuel element can be more significant and thus may require an even lower flux to manage those effects. Additionally, control rods generally are 'pushed down' from the direction of one longitudinal end of the fuel element towards the central area of the fuel element. These effects can be considered in determining the expected neutron flux and also considered in engineering and selecting the smear density for the fuel at various locations along the length of the fuel element to compensate or influence the expected flux distribution along the length of the fuel element. Based on these principles, the multi-smear fuel element may be provided with various selected smear densities at selected locations along the length of the fuel element to favor breeding toward one end of the fuel element thereby pulling the flux distribution towards or away one or the other longitudinal ends of the fuel element and/or reducing the rate of change or increase the flattening of the flux distribution over the length of the fuel element).

Many variables contribute to strain in fuel elements, such as burn-up, displacements per atom (DPA) history, DPA rate history, fission gas release, smear density, time history, cladding material, cladding dimensions, and operational temperatures such as linear heat rate, heat transfer coefficient, and even smear density point differences. In the various embodiments disclosed herein, the fuel can be selectively determined based on the strain limit for the target burn-up in that location as well as in consideration of thermal creep, flux, and/or burn-up. For the embodiment with discrete fuel bodies, whether in fuel pellet form or fuel slug form or other body shape, different diameters (both inner and outer diameters in relevant cases) can be used. For example considering fuel pellets or rods, fuel diameters could be large at a first longitudinal end (i.e., up to the strain limit or the target burn-up in that location), narrower in the middle (region with highest burn-up) of the longitudinally oriented fuel element, and then expand at a second longitudinal end (i.e., up to the strain limit or the target burn-up in that location). Thermal creep is larger at the end of the fuel element that functions as the exit for cooling media due to higher temperatures in this region, so for longer term operation, the actual burn-up and design considerations such as operational creep need to be computationally iterated to find the optimum. Similar considerations can be made for fuel forms which are annular, foamed fuel, or packed pellets with a desired porosity, fuel loading, etc. Also, initial fuel can be loaded with varying porosity (in addition to or alternative to loading full density fuel). Metal fuel, such as in the TWR, expands due to solid and gaseous fission products. The metal fuel tends to fill the volume it is contained within, within the initial couple percent burn-up (early in life). In order to maintain transport of fission gas within the fuel element, the initial smear density, porosity, and burn-up characteristic of the fuel may be considered within design strain limits of the form of the fuel, the aggregated fuel assemblies, and the overall core.

Figure 19:
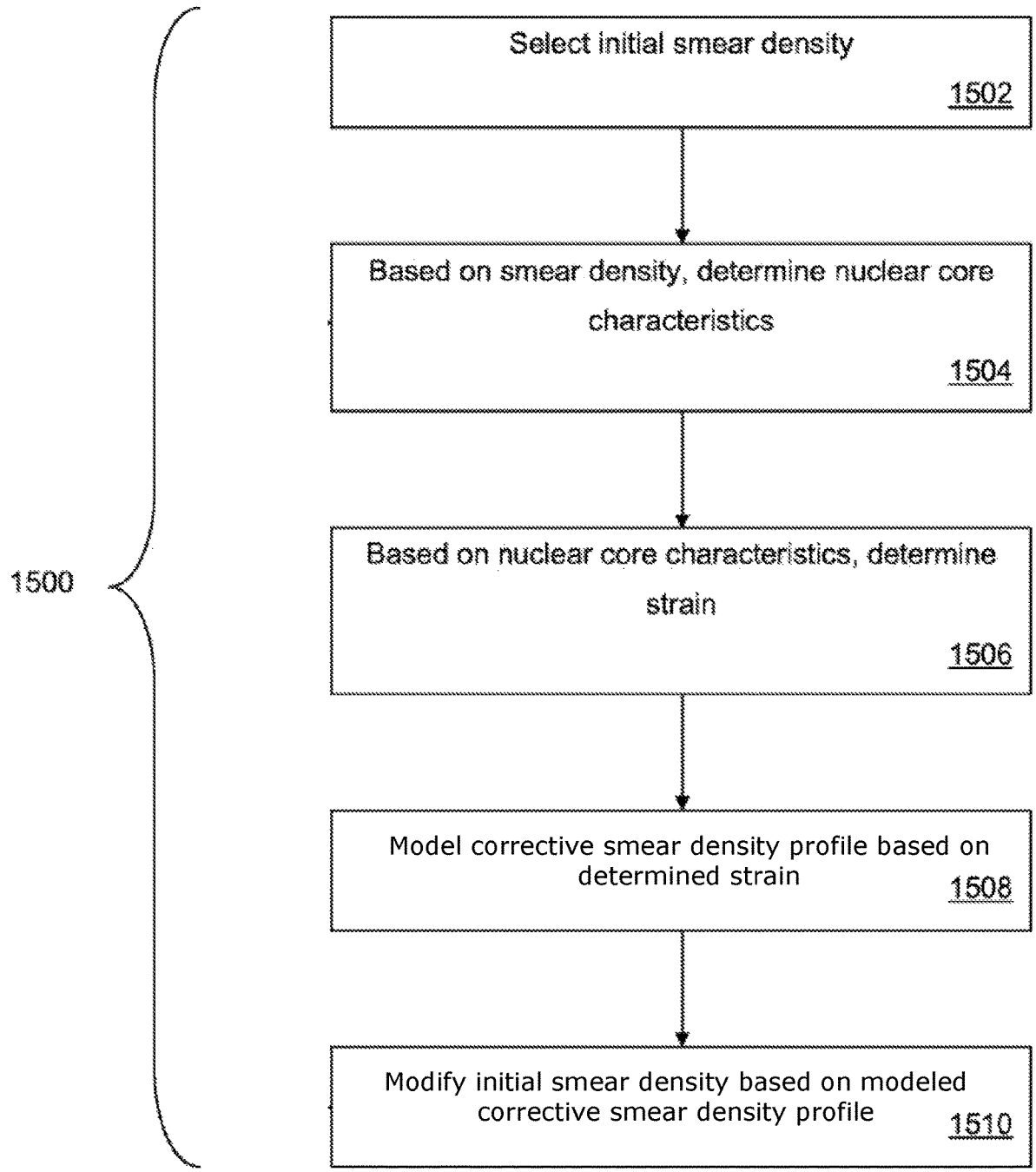
FIG. 19 is a flow chart of an example method of determining a selected variation of smear density along the length of a fuel element.

FIG. 19 illustrates an example method for decreasing the strain limit and/or increasing fuel burn-up limits by determining the desired distribution of flux and the correlated distribution of smear density. Although the method is presented as a sequence of steps for illustrative purposes, this sequence does not limit the scope of the claimed methods, and those of ordinary skill in the art will be aware of modifications and variations that may be made to the order, timing, etc. of the sequence. The figure is a series of steps or flowcharts depicting implementations. For ease of understanding, the steps or flowcharts are organized such that the initial steps or flowcharts present implementations via an example implementation and thereafter the following steps or flowcharts present other implementations and/or expansions of the initial steps or flowchart(s) as either subcomponent operations or additional component operations building on one or more earlier-presented steps or flowcharts. Those having skill in the art will appreciate that the style of presentation utilized herein (e.g., beginning with a presentation of a step(s) or flowchart(s) presenting an example implementation and thereafter providing additions to and/or further details in subsequent step(s) or flowchart(s)) generally allows for a rapid and easy understanding of the various process implementations. In addition, those skilled in the art will further appreciate that the style of presentation used herein also lends itself well to modular and/or object-oriented program design paradigms.

Determining the neutronic flux and smear density can be performed using any suitable method. Generally, commercially or government available software can provide the baseline analytics needed to simulate the reactor core and determine the flux. For example, a neutron transport simulator can be used to provide information regarding where the neutrons are within the core and fuel elements; a nuclide transmutation simulator can be used to determine how quickly fissionable atoms are breeding up (from fertile to fissile material) and burning (fission of the fissionable material); a neutron kinetics module can provide the distribution of heat generation along with a thermal hydraulics simulator can provide the heat conduction of the fuel element and temperature profile and determine the maximum strain and maximum allowable burn-up for a particular component such as the fuel element, and a mechanical interaction simulator and fuel performance feedback software can optionally be used to determine other mechanical interactions (such as fuel bowing and interaction with ducts which may affect the neutronic and thermal hydraulics of the system). Various available computer modules may be used including, but not limited to SERPENT available from http://montecarlo.vtt.fi/, MCNp6 available from https://mcnp.lanl.gov/, REBUS available from http://www.ne.anl.gov/codes/rebus/, ERANOS available from https://www.oecd-nea.org/tools/abstract/detail/nea-1683, DRAGON available from http://www.polymtl.ca/nucleaire/en/logiciels/index-.php, and the like.

As shown in the example method 1500 of FIG. 19, an initial smear density distribution over the length of fuel element is selected 1502. The initial smear density distribution may be any suitable initial starting point which may approximate a uniform smear density or crude or coarse distribution along the length of the fuel element. At 1504, the operational characteristics of the nuclear core are determined based at least in part on the smear density of the fuel element, using known and future methods such as those discussed above with respect to commercially, government, and openly available simulation and analysis tools. Operational characteristics include those variables such as neutronics, thermal hydraulics, fuel performance feedback, mechanical interactions, neutron kinetics and neutron flux distribution, etc. which may include burn-up, displacements per atom (DPA) history, DPA rate history, fission gas release, smear density, time history, cladding material, cladding dimensions, and operational temperatures such as linear heat rate, heat transfer coefficient, and even smear density point differences. Based on the determined operational characteristics, a profile of the fuel strain along the longitudinal axis of the fuel element can be determined 1506. For example, the determination operation 1506 may entail determining strain on selected zones of the fuel element based on the initial smear density distribution and determined nuclear core characteristics.

A corrective smear density profile 1508 can then be modeled based on the profile of the fuel strain. In one implementation, the corrective smear density profile is designed to offset and "flatten out" high strain regions. For example, strain may be computed for a homogenous smear density and the smear density may then be selectively increased in areas of low strain and decreased in areas of high strain to flatten out the corrective fuel strain profile. As a result, the corrective smear density profile 1508 may include regions of increased smear density corresponding to areas of low strain in the original strain profile and areas of decreased smear density in regions corresponding to areas of high strain in the original strain profile.

In one implementation, the corrective smear density profile is constructed based on a zone-by-zone assessment of the modeled strain. For example, the strain for each zone of the fuel element can be determined (e.g., based on nuclear core characteristics specific to the zone) and this localized strain can then be compared to one or more thresholds, such as a threshold maximum and/or minimum. Based on the comparison of the threshold(s) to the modeled strain, the initial smear density for the associated zone can be modified 1510 (e.g., increased or reduced) to arrive at the corrective smear density for the zone. This corrective smear density forms a portion of the corrective smear density profile of the fuel element. This process can be repeated for each individual zone to generate, by iteration, a smear density profile that offsets the effects of fuel strain and/or uneven flux, resulting in a higher average burn-up rate across the length of the fuel element.

As mentioned above, construction of the corrective smear density profile 1508 may entail comparing localized fuel strain to a strain threshold or set of thresholds with respect to each of the different zones. In some implementations, a uniform strain threshold or uniform set of strain thresholds are commonly used for assessment of corrective strain to be applied within each individual zone. In other implementations, the strain threshold(s) are individually set for the different zones based on the structures, materials, and/or other core components proximate to each of the zones of the fuel element.

The strain threshold(s) can be any suitable threshold to meet the design characteristics of the system (which can be approximated with a flux distribution, burn-up limit, etc.). When strain in a selected zone of the fuel element violates a strain threshold (either higher than the maximum strain threshold or below the minimum threshold), the initial smear density for the associated zone can be modified, e.g., reduced or increased based on the degree of the threshold violation. For example, smear density may be reduced dramatically in a region with very high strain in excess of a maximum strain threshold; likewise, smear density may be increased slightly in a region with low strain that is just less than a minimum strain threshold. As a result, the corrective smear density profile has the effect of flattening out the flux distribution (e.g., reducing strain across the length of the fuel element).

The above process of determining smear density (e.g., the initial smear density), modeling strain, and adjusting smear density (e.g., the corrective smear density) may be repeated multiple times in each zone until the corrective strain profile is determined to meet some suitable stopping criteria. Other considerations within the iteration of determining the corrective smear density within each zone may include any one or more of ensuring $k_{eff}>1$ (ensure criticality of the core by ensuring sufficient fissionable material to maintain criticality), peak core power needed to be retained, etc. Any one or more of these considerations can be further constraints on iterating and potentially optimizing the fuel smear density profile along the length of the fuel element.

As noted above in discussing the illustrative embodiments, the smear density can vary with position along the longitudinal axis between a minimum of 30% and a maximum of 100%. Alternatively, the smear density is 50% to 70% or 50% to 75%. In one embodiment, the first longitudinal end of the fuel element has a 50% smear density and a second portion of the fuel element, such as the second longitudinal end, has a different (e.g., greater) smear density (e.g., 55%, 65%, 70%, 75%, etc.). In another embodiment, the second longitudinal end of the fuel element has a 50% smear density and a second portion of the fuel element, such as the first longitudinal end, has a different (e.g., greater) smear density (e.g., 55%, 65%, 70%, 75%, etc.). In a still further embodiment, the central longitudinal portion of the fuel element has a 50% smear density and a second portion of the fuel element, such as both the first longitudinal end and the second longitudinal end, has a different (e.g., greater) smear density (e.g., 55%, 65%, 70%, 75%, etc.).

Notably, fuel strain can be influenced by both smear density and cladding thickness. Therefore, some implementations may achieve the effect of flattening-out the fuel strain profile by manipulating cladding thickness rather than (or in addition to) smear density. For example, some implementations may model a corrective cladding thickness profile in lieu of or in addition to the corrective smear density profile described above. Modifications to a fuel element can then be implemented to cladding thickness based on the corrective cladding thickness profile. Such modifications may be made in isolation or combination with modifications to fuel density based on a corrective smear density profile, as described above.

Figure 20:
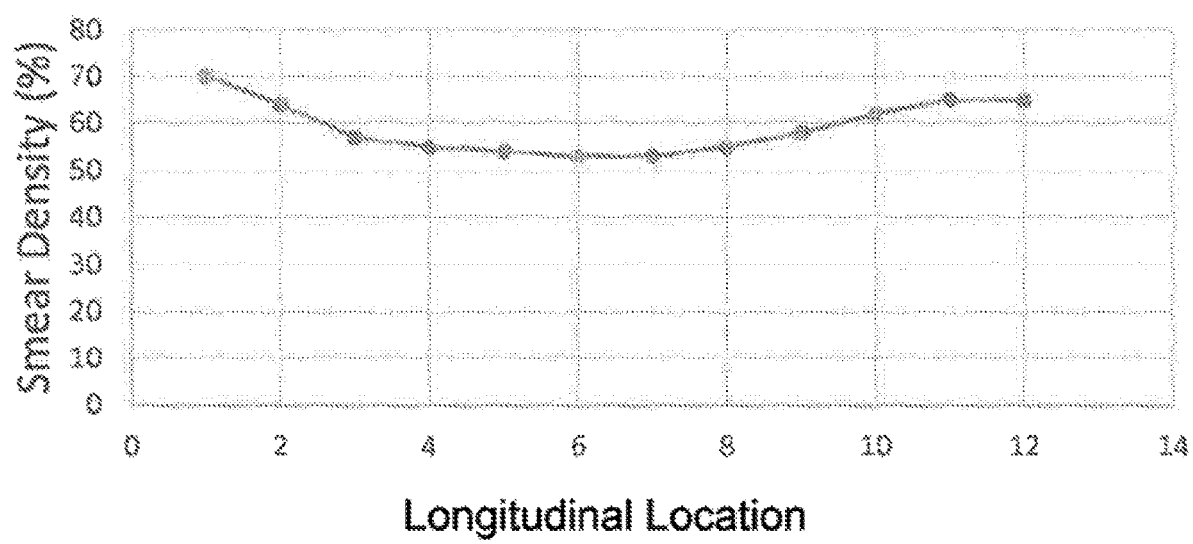
FIG. 20 is a graph of smear density (%) as a function of longitudinal location (in arbitrary units) for an example embodiment of a fuel element.

FIG. 20 is a graph of smear density (%) as a function of longitudinal location (in arbitrary units) for a first example embodiment of a fuel element. In the FIG. 20 graph, the longitudinal locations are zoned ranging from one to 12. The smear density varies substantially continuously from 70% in the first zone to 52% in zone 6 and 7 and then to 65% in zones 11 and 12. Varying the smear density in this manner can flatten out the expected distribution of flux (typically a substantially Gaussian distribution if the fuel smear density is not varied) that the fuel element will encounter, and allow for higher burn-up of the fuel overall due to the higher burn-up achieved at the end zones 1-3 and 10-12.

Figure 21:
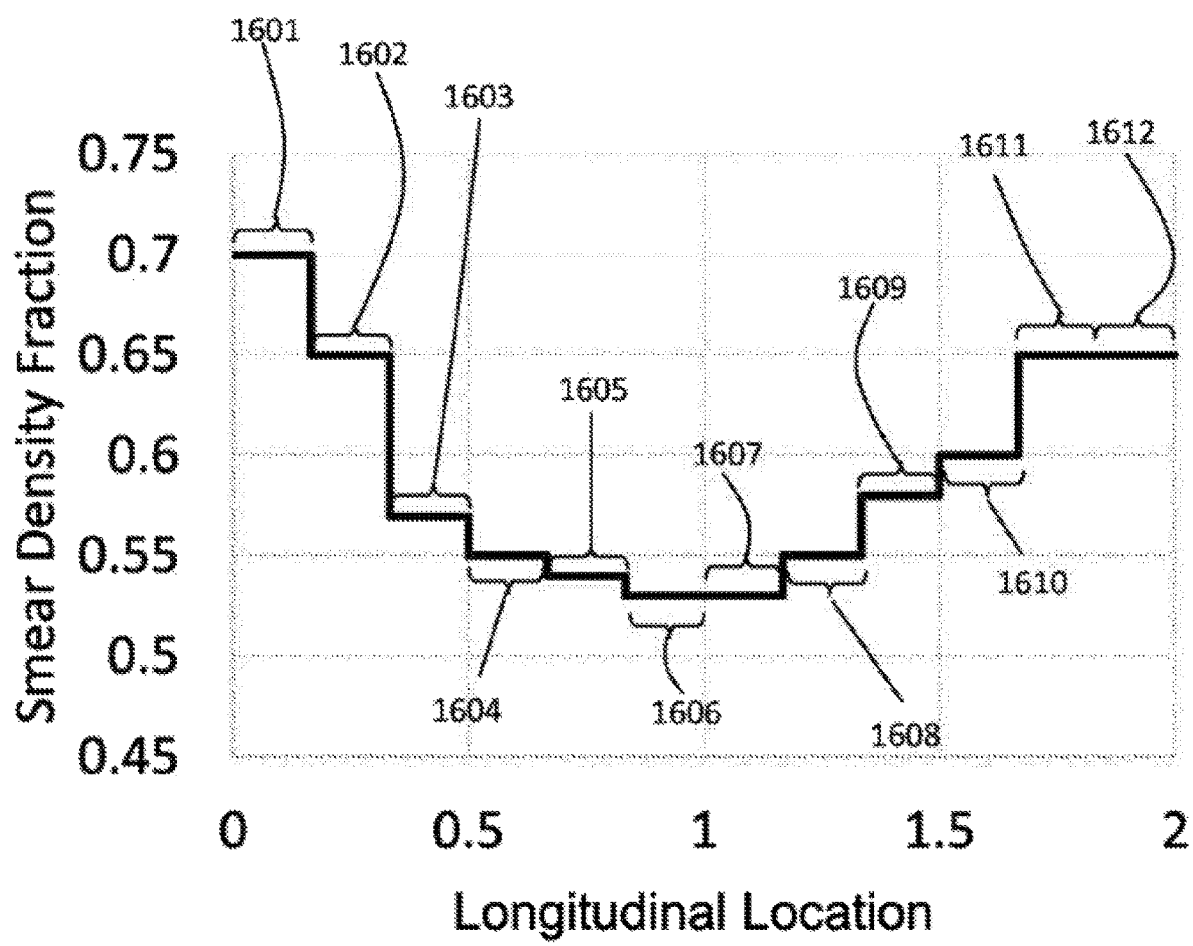
FIG. 21 is a graph of smear density (fraction) as a function of longitudinal location (in arbitrary units) for another example embodiment of a fuel element.

FIG. 21 is a graph of fractional smear density as a function of longitudinal location (in arbitrary units) for a second example embodiment of a fuel element. In the FIG. 21 graph, the longitudinal locations include twelve zones 1601, 1602, 1603, 1604, 1605, 1606, 1607, 1608, 1609, 1610, 1611, 1612. Although each of the zones in FIG. 21 is shown to be of equal size, it is to be appreciated that the zones may differ in longitudinal length of the fuel element as compared to other zones. The fractional smear density varies in stepwise fashion from 0.70 in the first end zone 1601 to 0.53 in central zones 1606 and 1607 and then to 0.65 in second end zones 1611 and 1612.

The graphs in FIGS. 20 and 21 are representative of a longitudinal variation in smear density in a fuel element where the smear density at a first longitudinal end, e.g., zone 1601, is greater than the smear density at a second longitudinal end, e.g., zone 1612. This can help flatten out the expected flux variations along the longitudinal axis due many core factors including, for example, coolant entering at zone 1 and exiting at zone 12. The graphs in FIGS. 20 and 21 are also representative of a longitudinal variation of smear density in a fuel element where the smear density at both the first longitudinal end, e.g., zone 1601, and the second longitudinal end, e.g., zone 1612, is greater than the smear density at a longitudinal center of the elongated fuel element, e.g., zones 1606 and 1607.

Figure 22A:
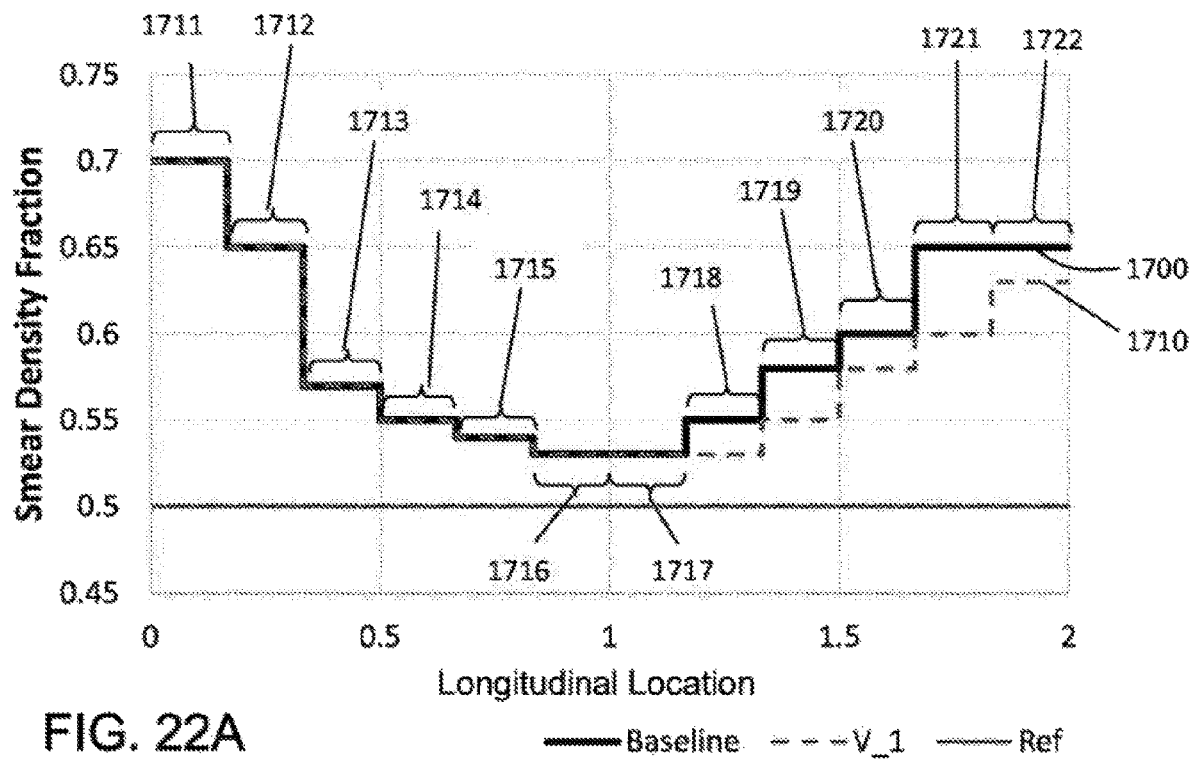
FIG. 22A-B is a graph of smear density (fraction) as a function of longitudinal location (in arbitrary units) for several other example embodiments of a fuel element.
Figure 22B:
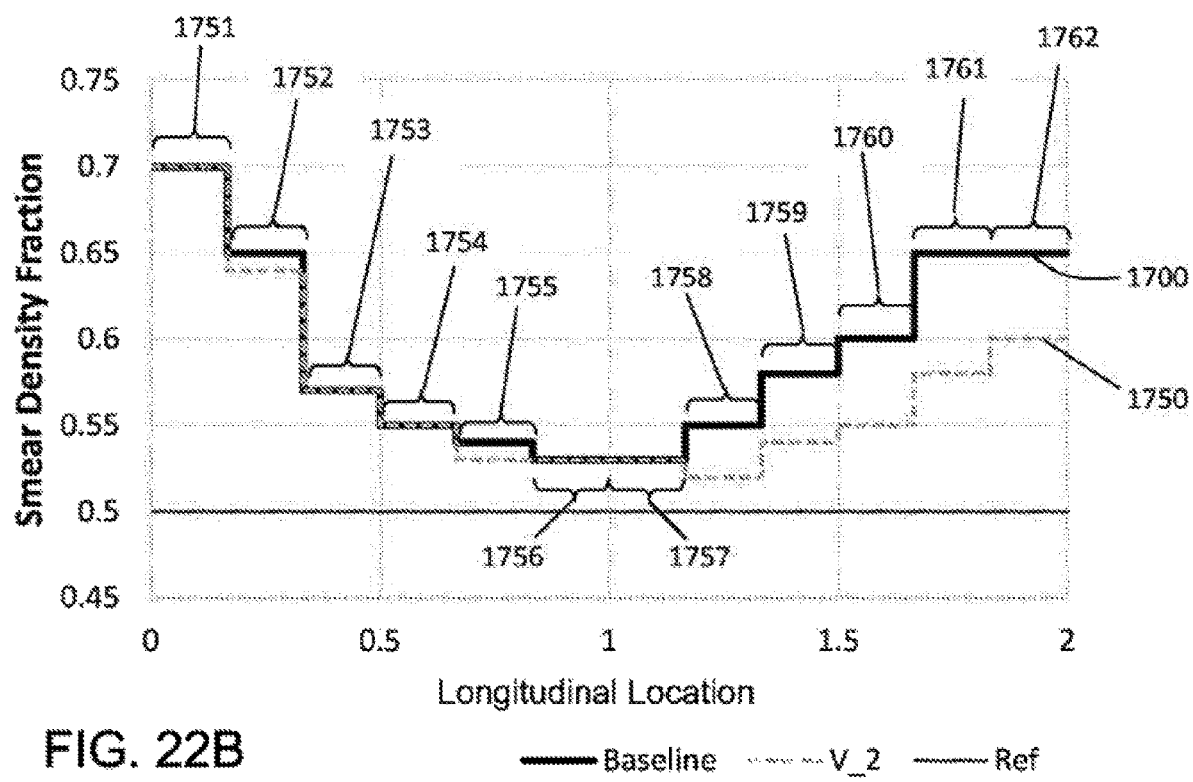

FIGS. 22A and 22B are graphs of smear density (fraction) as a function of longitudinal location (in arbitrary units or zones) for several other example embodiments of a fuel element. In the FIGS. 22A and 22B graph, the longitudinal locations include twelve zones and the smear density varies in stepwise fashion. The baseline (solid line 1700) represents the longitudinal variation in smear density from FIG. 21. Two variations of this baseline are illustrated—a first variation (V_1 in FIG. 21A indicated by the long dashed line 1710) and a second variation (V_2 in FIG. 21B indicated by the short dashed line 1750). The first variation (V_1) 1710 overlays the baseline 1700 at longitudinal locations in zones 1711, 1712, 1713, 1714, 1715, 1716, 1717, but in zones 1718, 1719, 1720, 1721, 1722 the smear density of the first variation (V_1) 1710 is lower than that for the same zone in the baseline 1700 and is less than the corresponding smear values in the first end in zones 1711, 1712, 1713, 1714, 1715 of V_1 variation 1710. In addition, in the first variation (V_1) 1710, the minimum in smear density occurs at a longitudinal center of the elongated fuel element that includes zones 1716, 1717, 1718. In general, the smear densities in zones 1719, 1720, 1721 in the first variation (V_1) 1710 are the same as in the corresponding one lower zone in the baseline 1700 (Smear Density$_{V\_1,\ zone\ n}$=Smear Density$_{baseline,\ zone\ (n-1)}$) by which, in the first variation (V_1) 1710, the smear density distribution in the zones 1719, 1720, 1721, 1722 of the fuel element has been modified to match a lower value in the second longitudinal end relative to the baseline 1700 (the smear density of a particular location in the second end matches the smear density of a corresponding segment of the baseline variation more centrally located relative the particular segment in the second variation) and, as a result, tends to further distribute the neutron flux toward the second end, and tends to shift the neutron flux towards the first end overall. The second variation (V_2) 1750 of FIG. 21B overlays the baseline 1700 at some longitudinal locations, for example, at zones 1751, 1753, 1754, 1756 and 1757, but in the other zones the smear density of the second variation (V_2) 1750 is lower than that for the same zone in the baseline 1700. In addition, in the second variation (V_2) 1750, the minimum in smear density occurs at a location off-centered from the longitudinal center of the elongated fuel element toward the second longitudinal end. In the second variation (V_2) 1750 example, the minimum smear density is 52% (or fractional smear density of 0.52) in zone 1758. In general, the variations in smear densities in the second variation (V_2) 1750 compared to the baseline 1700 are such that the smear densities in the first longitudinal zones (1751, 1752, 1753) and in the second longitudinal zones (1759, 1760, 1761, 1762) include smear densities that are the same as or lower than in the corresponding zones in the baseline 1700. Further, in the second end longitudinal zones, the smear densities in zones 1760, 1761, 1762 are the same as in the corresponding two lower zones in the baseline (Smear Density$_{V\_2,\ zone\ n}$=Smear Density$_{baseline,\ zone\ (n-2)}$) by which the smear density distribution in the second end zones (1759-1792) of the fuel element has been shifted to a lower value in the second longitudinal end relative to the same segment in the baseline 1700 and, as a result, tends to further distribute the neutron flux toward the second end, and tends to shift the flux towards the first end overall. A smear density fraction of 50% (or fractional smear density of 0.50) is shown in FIGS. 22A and 22B as a reference.

The improvements and benefits of longitudinal variation in smear density in a fuel element as compared to fuel elements having a uniform smear density can be demonstrated using the software simulation and analysis tools described above. In a first simulation (shown graphically in FIG. 23), a fuel element had a uniform smear density fraction as a function of longitudinal location. The fuel element in this first simulation included a substantially uniform smear density of 50% (smear density fraction of 0.5) with a burn-up limit of approximately 30%. In the second simulation (shown graphically in FIG. 24), a fuel element had a smear density fraction that varied as a function of longitudinal location. In FIG. 24, the smear density fraction 1930 is presented as a pseudo curve fit of the segmented variation of smear density along the longitudinal length of the fuel element and varies from approximately 70% in longitudinal location 1 to approximately 50% around longitudinal location 4. The material, geometries, etc. and other characteristics of the fuel elements in the first simulation (shown in FIG. 23) and in the second simulation (shown in FIG. 24) were substantially the same and were operated at substantially the same operating conditions and boundary conditions and varied only with respect to the longitudinal variation of smear density fraction. Accordingly, the change in burn-up limit and burn-up for each of the fuel elements in the simulations, as well as the difference in fuel utilization efficiency, can be attributed to the difference in longitudinal variation of smear density fraction between the two fuel elements in the two simulations.

Figure 23:
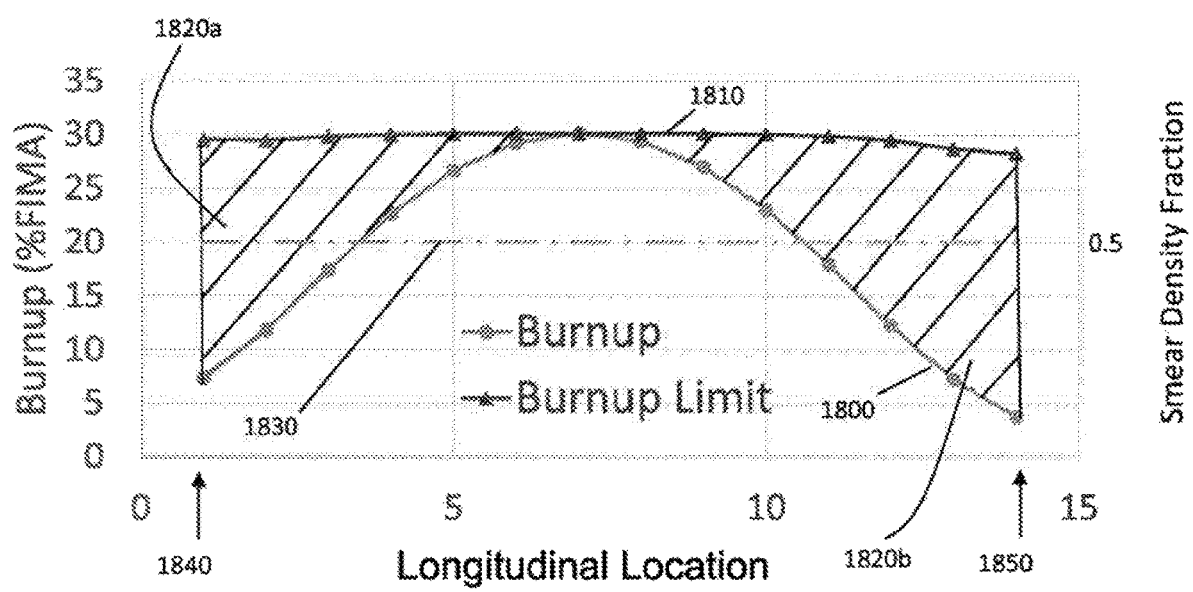
FIG. 23 is a graph showing burn-up (in % FIMA) as a function of longitudinal location (in arbitrary units) for a fuel element with constant smear density as a function of longitudinal location.
Figure 24:
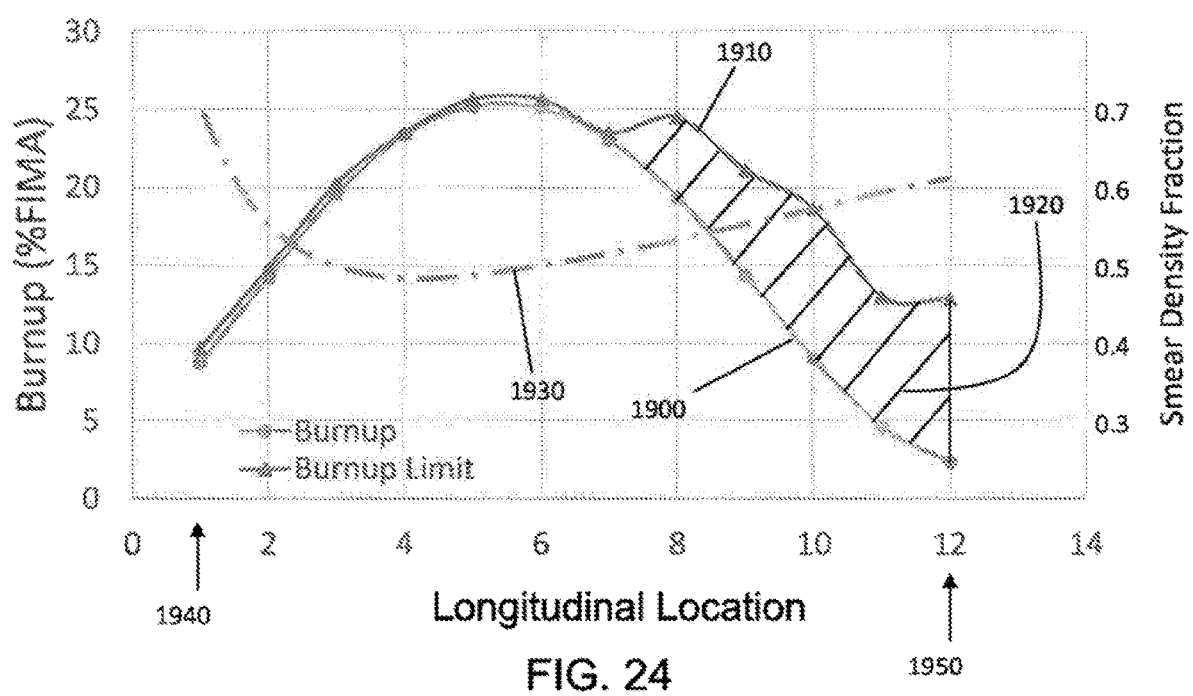
FIG. 24 is a graph showing burn-up (in % FIMA) as a function of longitudinal location (in arbitrary units) for a fuel element with a smear density that varies as a function of longitudinal location.

FIGS. 23 and 24 illustrate the burn-up limit, burn-up and smear density fraction as a function of longitudinal position (in arbitrary units or zones) for the two simulations (the first simulation in FIG. 23 and the second simulation in FIG. 24). FIG. 23 illustrates an equilibrium cycle distribution plot of fuel nuclides relating burn-up (in % FIMA (fissions per initial metal atom)) to longitudinal location for conventional nuclear reactors in which the smear density is nominally constant with position along the longitudinal axis. Profile 1830 illustrates the smear density fraction as a function of longitudinal position. Profile 1800 is the distribution of burn-up over the longitudinal length of the fuel element and has a shape substantially of that of an inverted cosine. The profile 1800 is a function of the physics of the system with a constant smear density and time integrated flux on the fuel, which produces a distribution with a peak toward the longitudinal center. Reference profile 1810 illustrates the maximum burn-up limit for the system. The difference between the burn-up in profile 1800 and the burn-up limit in reference profile 1810 (see shaded area 1820a and 1820b between profile 1800 and profile 1810) represents the amount of fuel available, but not used and not achieving its potential burn-up limit at the locations proximate the longitudinal ends due to the fuel material in the longitudinal central portion of the fuel element reaching its burn-up limit and thus, requiring the need to retire the fuel element despite available fuel in the longitudinal end portions. This 'early' retirement of a fuel element in FIG. 22 relates to the lower efficiency of the uniform smear density (as represented by the larger the area between the burn-up and the burn-up limit, indicating the system is less efficient with regards to fuel utilization).

FIG. 24 illustrates an equilibrium cycle distribution plot of fuel nuclides relating burn-up (in % FIMA (fissions per initial metal atom)) to longitudinal location for a nuclear reactor in which the smear density in the fuel elements varies with position along the longitudinal axis. Profile 1900 displays a cosine-like distribution of actual burn-up over the longitudinal length of the fuel element with a maximum of 25% FIMA at about longitudinal position 5.5. This distribution of burn-up over longitudinal length reflects the varied smear density over the same longitudinal length with zones 1-3 having a higher smear density than the smear density of zones 9-12, and zones 9-12 having a higher smear density than the central zones 4-8. Compared to the reference profile 1800 of the conventional reactor with uniform smear density, the profile 1900 has a reduced maximum burn-up (25% FIMA compared to 30% FIMA) and a reduced global maximum overall. Also compared to the reference profile 1800 of FIG. 23, the profile 1900 of FIG. 29 is shifted toward the first longitudinal end (1940 in FIG. 24 and is located at longitudinal location 1; corresponding first longitudinal end in FIG. 23 is 1840 and located at longitudinal location 1), and the burn-up at the first longitudinal end is increased and the burn-up at the second longitudinal end (1950 in FIG. 24 and located at longitudinal location 12; corresponding second longitudinal end in FIG. 23 is 1850 and is located at longitudinal location 14) is decreased and as a result, the overall burn-up of the fuel element is increased and better meets the overall potential burn-up through the entire fuel element. Reference profile 1810 of FIG. 23 illustrates the potential or maximum allowable burn-up limit for the fuel element. The difference between the burn-up in profile 1800 and the burn-up limit in reference profile 1810 is represented by areas 1820a and 1820b and represents the amount of fuel available, but not being used, and relates to the efficiency of the conventional nuclear reactor (the smaller the area between the burn-up and the burn-up limit, the more efficient is the system). In FIG. 24, the difference between the burn-up in profile 1900 and the burn-up limit in reference profile 1910 is represented by area 1920. Area 1920 is reduced (relative to areas 1820a and 1820b illustrated in FIG. 23), particularly in the portion of the fuel element from the first longitudinal end to past the longitudinal center of the elongated fuel element. A reduced difference between the burn-up in profile 1900 and the burn-up limit in reference profile 1910 indicates that the nuclear reactor in which the smear density in the fuel elements varies with position along the longitudinal axis is more efficient in its fuel utilization than the conventional nuclear reactor with uniform smear density.

It is to be appreciated that the difference between the actual burn-up and the burn-up limit may be designed through smear density to substantially match in all zones, be optimized globally over all zones, and/or be optimized in a subset of zones, e.g., the first longitudinal end and central zones while leaving some unmet burn-up limit at the second longitudinal end due to other design constraints or desires, such as safety margin in the higher temperature second longitudinal end due to proximity to coolant exit, etc. It is to be appreciated that selecting the smear density to match certain desired and selected design characteristics of the fuel element and/or nuclear core while meeting other design constraints can be utilized using the general methods described herein including optimizing for peak power, peak temperature, criticality, burn-up limit, strain, cladding stability, etc.

FIG. 24 also illustrates that, by adding more fuel (e.g., increasing the smear density) above and below the expected peak burn-up location relative to the central location in conventional systems (for example, at or towards the respective longitudinal ends), the peak burn-up is reduced and the burn-up distribution is flattened and shifted. The process of longitudinally varying smear density as disclosed herein can be used to longitudinally spread out the burn-up distribution, reduce the strain on the fuel element and fuel assembly, and/or increase the overall burn-up of a fuel element allowing for more efficient use of fuel material within a nuclear reactor. Further, the variation between profile 1900 and reference profile 1910 demonstrates that longitudinal variation in smear density meaningfully increases fuel utilization efficiency, preferably increases fuel utilization efficiency by 10% or greater.

As an additional benefit, longitudinal variation of smear density contributes to reactor design benefits. For example, the overall longitudinal length in the fuel element represented by FIG. 24 is less than the overall longitudinal length in the fuel element represented by FIG. 23. However, although the fuel element represented by FIG. 24 is shorter than the fuel element represented by FIG. 23, the fuel utilization efficiency is greater in the fuel element represented by FIG. 24 than in the fuel element represented by FIG. 23. In one example, the height of the fuel column decreased from 2.4 meters to 2.0 meters while at the same time the fuel mass decreased by 2%. Thus, FIGS. 23 and 24 illustrate an attendant benefit to reactor design from incorporating longitudinal smear density variation—shorter fuel elements which are more efficient with respects to fuel utilization and that can contribute to more compact and efficient reactor designs without reducing power output of the reactor. Also, a decreased fuel column height (in addition to the mechanical advantage of smaller reactor) can provide reduce pressure drop in associated coolant over less length.

Figure 25:
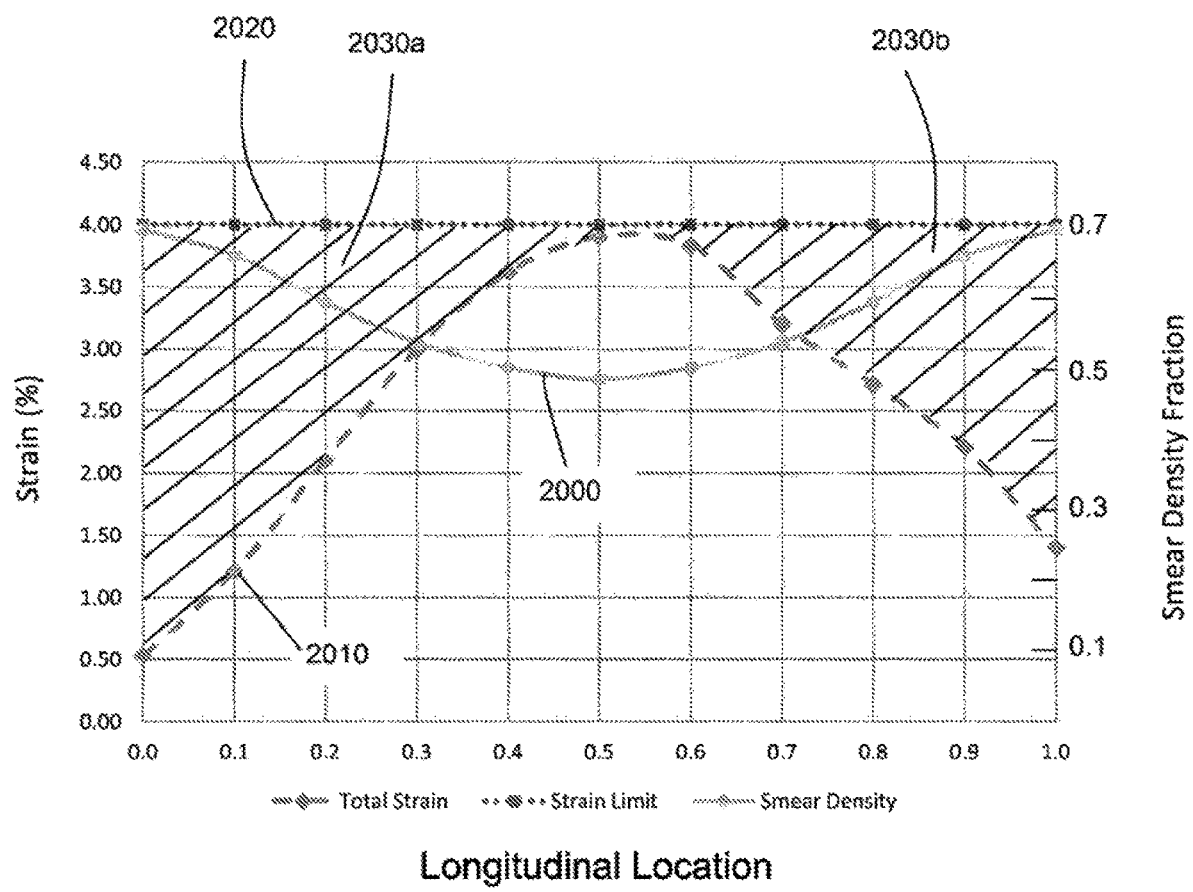
FIG. 25 is a graph showing strain as a function of longitudinal location (in arbitrary units) for a fuel element with a smear density that varies as function of longitudinal location.

FIG. 25 illustrates the strain limit, strain and smear density fraction as a function of longitudinal position (in normalized units or zones) in a fuel element which varies smear density with longitudinal length. Profile 2000 illustrates the smear density fraction as a function of longitudinal position and is illustrated as a pseudo-curve fit of the segmented smear density in each zone of the normalized longitudinal location. Profile 2000 of the smear density fraction varies from between about 45% and 50% in a central portion (at longitudinal location 0.5) to about 70% at the end portions (at longitudinal location 0 and 1.0) and has the shape that approximates an inverted Gaussian distribution. Profile 2010 illustrates a distribution of strain over the longitudinal length of the fuel element and has a shape substantially of that of an inverted cosine. The profile 2010 is a function of the physics of the system and the selectively varied smear density and time integrated flux on the fuel, which produces a distribution with a peak strain toward the longitudinal center. Reference profile 2020 illustrates the maximum strain limit for the system. The difference between the strain in profile 2010 and the strain limit in reference profile 2020 (see shaded area 2030a and 2030b between profile 2010 and profile 2020) represents the amount of strain safety margin at the locations proximate the edges due to the fuel material in the central portion of the fuel element reaching its strain limit. Although the figure shows the example as a single longitudinal location of the fuel column hitting the maximum strain, one or more sections of the fuel column may hit the strain limit and may have other curves of strain or even variable strain thresholds along the length of the fuel element.

FIG. 25 illustrates a maximum strain limit for the system (reference profile 2020) with a constant value as a function of longitudinal location. However, the constant strain limit shown in the figures is only an example and other strain limits, including variable strain limits, are possible to allow higher strain in some locations and lower strains at other locations. One of skill in the art can recognize that the multi-smear fuel disclosed herein can be tailored to accommodate a variable strain limit and allow more strain at the associated location of the higher strain limits.

Figure 26:
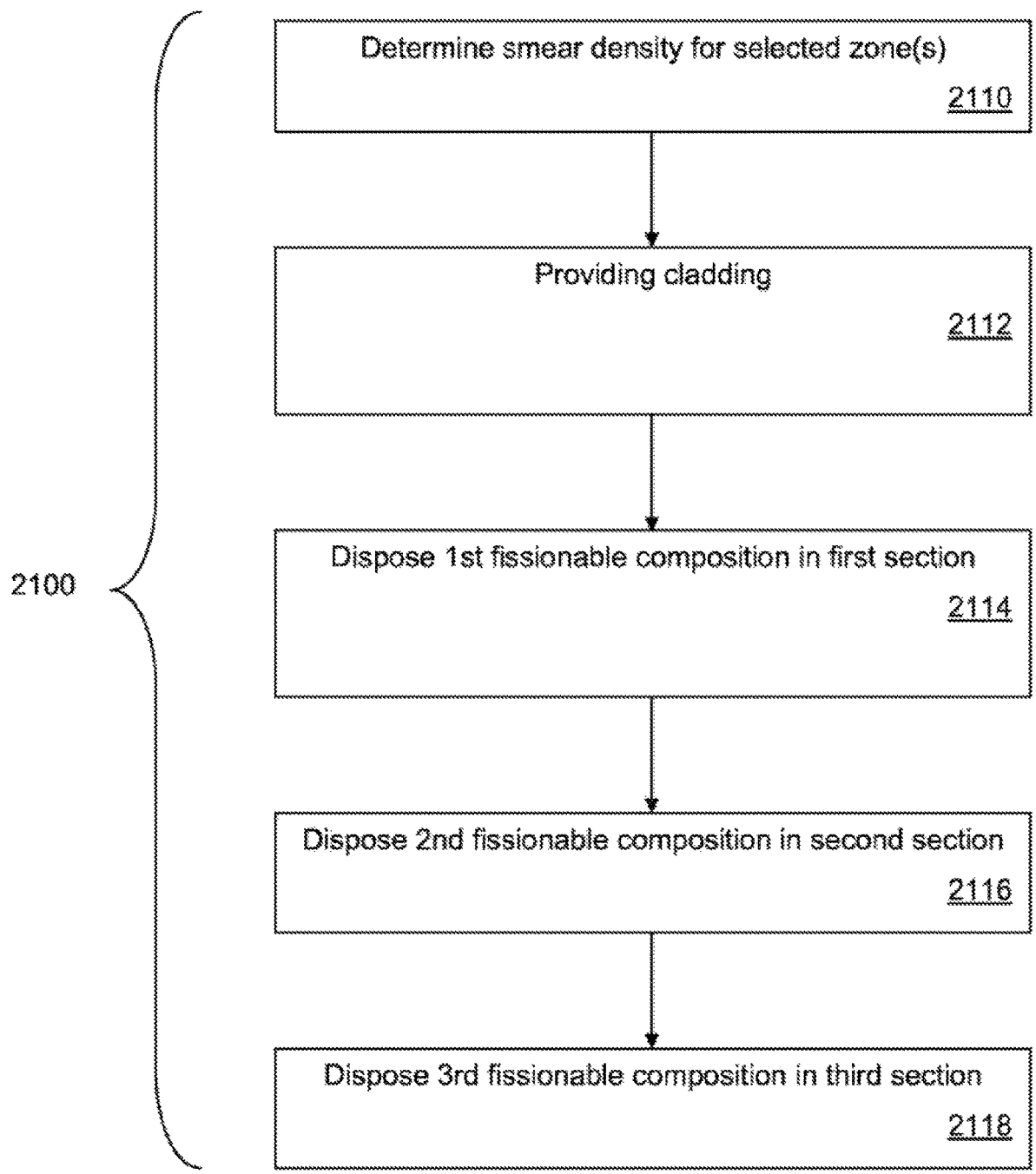
FIG. 26 is a flow chart of an example method of manufacturing a fuel element with a selected variation of smear density along the length of the fuel element.

FIG. 26 illustrates an example method 2100 of manufacturing a fuel element with varied smear density along the longitudinal length of the fuel element. The selected smear density at each zone of the fuel element may be determined 2110 in any suitable manner such as that described with reference to FIGS. 19, 22 and 23 above. The cladding may be provided 2112 and defines an interior volume. As noted above, the cladding may include one or more liners and may comprise any suitable material for containing a fuel composition and may include tubular shaped walls. Although the following method is described with reference to 12 zones along the longitudinal length of the fuel element and three general sections (first end, central section, and second end), it is to be appreciated that any number of zones and/or sections may be used as appropriate to achieve the desired manufacturing and/or operational fidelity characteristics desired. Moreover, each zone and/or section may be of similar length and/or size and shape as the other zones and/or sections along the longitudinal length of the fuel element, and it is to be appreciated that the zones and/or sections may be of different lengths relative to other zones and/or sections within the same fuel element as appropriate for the determined and selected distribution profile of the smear density.

A first fissionable composition containing a fissionable nuclear fuel material may be disposed 2114 in a first section of the interior volume of the cladding proximate a first longitudinal end of the nuclear fuel element. The first fissionable composition may be in thermal transfer contact with an interior surface of the cladding. The first fissionable composition may have a first smear density. Within the first section, the smear density can vary continuously, vary step-wise, be non-variant or be a combination thereof as a function of longitudinal position along the length of the fuel element to achieve the determined smear density for that section.

Disposing the fissionable composition in the cladding may be accomplished with any of the techniques described above which may include, without limitation, inserting a pellet (or other body shape of the fissionable composition, for example powder, particulate, slug, etc.) and may include additional steps of compacting or consolidating the fissionable composition such as sintering, vibration, blowing, tamping, etc.

A second fissionable composition, also containing a fissionable nuclear fuel material, which may be the same as or different from the first fissionable nuclear fuel material, may be disposed 2116 in a second section of the interior volume of the cladding proximate the central section. The second section of the interior volume of the cladding may be adjacent and/or spaced from the first section. The second fissionable composition may be in thermal transfer contact with the cladding and may have a second smear density. The second smear density may be different from the first smear density. To flatten out the burn-up profile of the fuel element, the second smear density may be less than the first smear density, and in some cases, may compensate for difference in coolant temperature (e.g., if the first longitudinal end is proximate a coolant entry point of the fuel assembly and the second longitudinal end is proximate the coolant exit point of the fuel assembly). Within the second section, the smear density can vary continuously, vary step-wise, be non-variant or be a combination thereof as a function of longitudinal position along the length of the fuel element to achieve the determined smear density for that section.

A third fissionable composition, also containing a fissionable nuclear fuel material, which may be the same as or different from the first and/or second fissionable nuclear fuel materials, may be disposed 2118 in a third section of the interior volume of the cladding proximate a second longitudinal end of the nuclear fuel element. The third section of the interior volume of the cladding may be adjacent and/or spaced from the second central section. The third fissionable composition may be in thermal transfer contact with the cladding and may have a third smear density. The third smear density may be different from the first and/or second smear density. To flatten out the burn-up profile of the fuel element, the third smear density may be greater than the second smear density. In some cases, it may be appropriate for the third smear density to be less than the first smear density. Within the third section, the smear density can vary continuously, vary step-wise, be non-variant or be a combination thereof as a function of longitudinal position along the length of the fuel element to achieve the determined smear density for that section.

The first section proximate the first longitudinal end may be divided into any number of zones as appropriate for the selected fidelity of smear density distribution determined 2110. In one example, the first section may contain two zones. In this example, the first zone of the first section is proximate the first longitudinal end of the fuel element cladding may contain a fourth fissionable composition having a fourth smear density. The fourth smear density may be different from or the same as the first smear density of the first section. A second zone of the first section may be adjacent to the first zone and may have disposed therein a fifth fissionable composition having a fifth smear density. The fifth smear density may be the same as or different from the first smear and/or fourth smear densities, and in some cases, the fifth smear density may be less than the fourth smear density. The volume average of the fourth and fifth smear densities may be equal to the first smear density of the first section overall.

Additionally and/or alternatively the third section, proximate the second end, may be divided into any number of zones as appropriate for the selected fidelity of smear density distribution determined 2110. In one example, the third section may contain two zones—and as appropriate, the number of zones in the third section may be the same as, greater than or less than the number of zones in the first and/or second sections. In this example the fourth zone of the third section (if the first section has first and second zone and the second section has one zone) is proximate the second section of the fuel element cladding and may contain a sixth fissionable composition having a sixth smear density. The sixth smear density may be different from or the same as the third smear density of the third section. A fifth zone of the third section may be adjacent to the fourth zone and may have disposed therein a seventh fissionable composition having a seventh smear density. The seventh smear density may be the same as or different from the third smear and/or sixth smear densities, and in some cases, the seventh smear density may be greater than the sixth smear density. The volume average of the sixth and seventh smear densities may be equal to the third smear density of the third section overall.

To provide higher fidelity in distribution or variation of smear density along the length of the fuel element, additional zones and/or sections may be implemented. In this example, a fuel element with three sections and twelve zones is described. The smear densities of the first, second and third sections may be as described above with respect to FIG. 26.

The first section proximate the first longitudinal end may be divided into any number of zones as appropriate for the selected fidelity of smear density distribution determined 2110. In this example, the first section may contain five zones. In this example, the first zone of the first section is proximate the first longitudinal end of the fuel element cladding may contain a fourth fissionable composition having a fourth smear density. The fourth smear density may be different from or the same as the first smear density of the first section. A second zone of the first section may be adjacent to the first zone and may have disposed therein a fifth fissionable composition having a fifth smear density. The fifth smear density may be the same as or different from the first smear and/or fourth smear densities, and in some cases, the fifth smear density may be less than the fourth smear density. A third zone of the first section may be adjacent the second zone and may have disposed therein a sixth fissionable composition having a sixth smear density. The sixth smear density may be the same as or different from the first, fourth, and/or fifth smear densities, and in some cases, the sixth smear density may be less than the fifth smear density. A fourth zone of the first section may be adjacent the third zone and may have disposed therein a seventh fissionable composition having a seventh smear density. The seventh smear density may be the same as or different from the first, fourth, fifth, and/or sixth smear densities, and in some cases, the seventh smear density may be less than the sixth smear density. A fifth zone of the first section may be adjacent the fourth zone and may have disposed therein an eighth fissionable composition having an eighth smear density. The eighth smear density may be the same as or different from the first, fourth, fifth, sixth, and/or seventh smear densities, and in some cases, the eighth smear density may be less than the seventh smear density. The volume average of the fourth, fifth, sixth, seventh and eighth smear densities may be equal to the first smear density of the first section overall.

The second central section may be divided into any number of zones as appropriate for the selected fidelity of smear density distribution determined 2110. In this example, the second section may contain two zones. In this example the sixth zone of the fuel element in the second section is proximate the first section of the fuel element and may contain a ninth fissionable composition having a ninth smear density. The ninth smear density may be different from or the same as the second smear density of the second section. A seventh zone of the second section may be adjacent to the sixth zone and may have disposed therein a tenth fissionable composition having a tenth smear density. The tenth smear density may be the same as or different from the second and/or ninth smear densities, and in some cases, the tenth smear density may be the same as the ninth smear density. The volume average of the ninth and tenth smear densities may be equal to the second smear density of the second section overall.

Additionally and/or alternatively the third section, proximate the second longitudinal end, may be divided into any number of zones as appropriate for the selected fidelity of smear density distribution determined 2110. In one example, the third section may contain five zones—and as appropriate, the number of zones in the third section may be the same as, greater than or less than the number of zones in the first and/or second sections. In this example, the eighth zone of the fuel element in the third section is proximate the second section of the fuel element and may contain an eleventh fissionable composition having an eleventh smear density. The eleventh smear density may be different from or the same as the third smear density of the third section, and in some cases may be greater than the second smear density of the second central section and/or the tenth smear density of the eighth zone. A ninth zone of the third section may be adjacent to the eighth zone and may have disposed therein a twelfth fissionable composition having a twelfth smear density. The twelfth smear density may be the same as or different from the third and/or eleventh smear densities, and in some cases, the twelfth smear density may be greater than the eleventh smear density. A tenth zone of the third section and adjacent ninth zone, may have disposed therein a thirteenth fissionable composition having a thirteenth smear density. The thirteenth smear density may be the same as or different from the third, eleventh, and/or twelfth smear densities, and in some cases, the thirteenth smear density may be greater than the twelfth smear density. An eleventh zone of the third section and adjacent the tenth zone, may have disposed therein a fourteenth fissionable composition having a fourteenth smear density. The fourteenth smear density may be the same as or different from the third, eleventh, twelfth, and/or thirteenth smear densities, and in some cases, the fourteenth smear density may be greater than the thirteenth smear density. A twelfth zone of the third section may be adjacent the eleventh zone and proximate the second longitudinal end of the fuel element and may have disposed therein a fifteenth fissionable composition having a fifteenth smear density. The fifteenth smear density may be the same as or different from the third, eleventh, twelfth, thirteenth, and/or fourteenth smear densities, and in some cases, the fifteenth smear density may be greater than the fourteenth smear density. The volume average of the eleventh, twelfth, thirteenth, fourteenth, and fifteenth smear densities may be equal to the third smear density of the third section overall.

In this example, within any one or more of the first to twelfth zones, the smear density can vary continuously, vary step-wise, be non-variant or be a combination thereof as a function of longitudinal position along the length of the fuel element to achieve the determined smear density for that zone.

Figure 27:
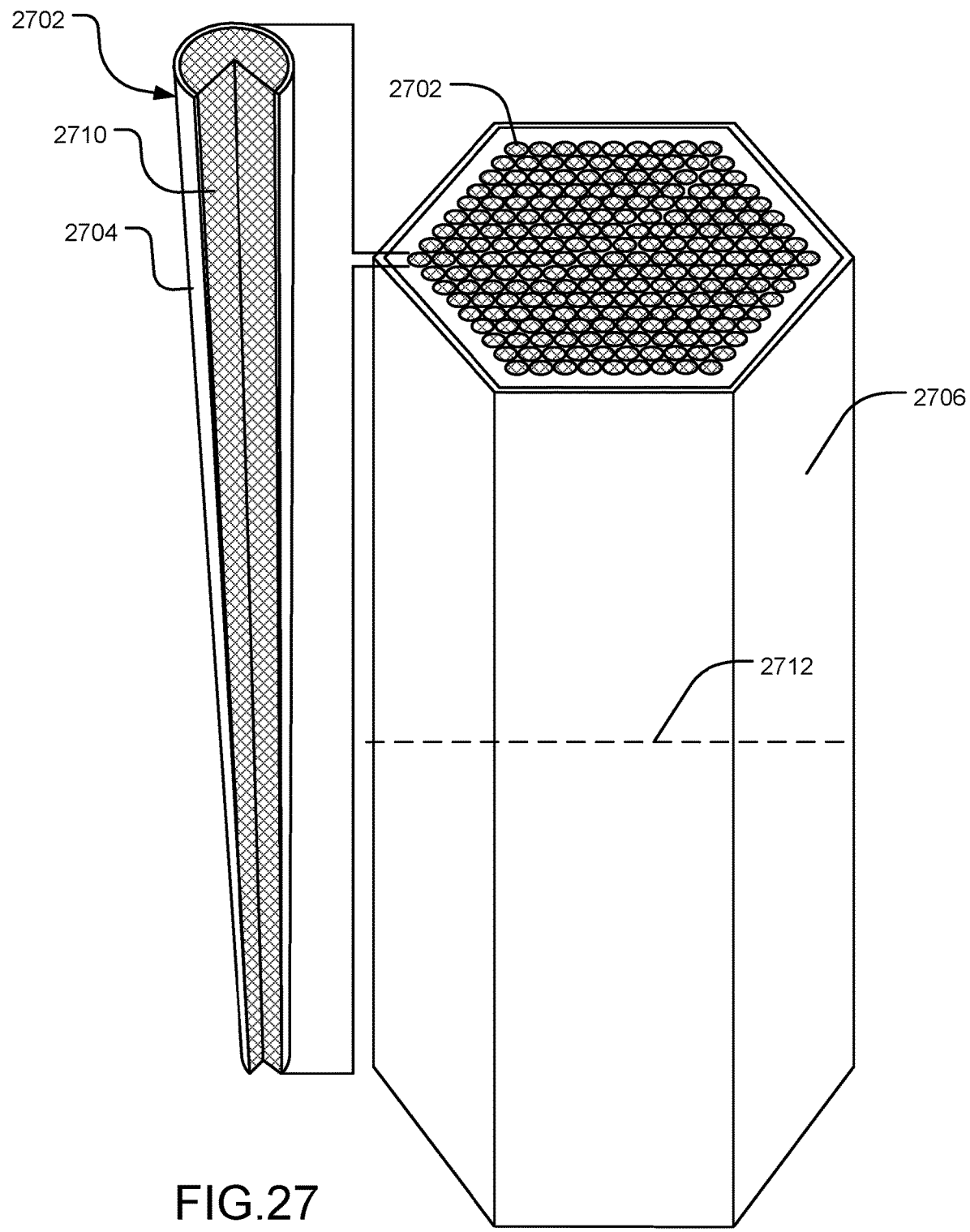
FIG. 27 illustrates an example system including a fuel assembly duct holding a number of individual fuel elements.

FIG. 27 illustrates an example arrangement 2700 including a fuel assembly duct 2706 holding a number of individual fuel elements (e.g., a fuel element 2702). Each of the fuel elements includes a cladding (e.g., cladding 2704) defining a tubular interior volume that stores a fissionable composition (e.g., fissionable composition 2710) in thermal transfer contact with an interior surface of the cladding. In one implementation, each fuel element is defined by a smear density profile that selectively varies with position along a longitudinal axis of the fuel element. As discussed with respect to other implementations above, the selectively variable smear density may be designed to offset points of natural strain in the fuel element. For example, regions of locally increased smear density may be deliberately positioned to coincide with regions of the fuel element 2702 that would otherwise exhibit locally decreased strain. Likewise, regions of locally decreased smear density may be deliberately positioned to coincide with regions of the fuel element 2702 that would otherwise exhibit locally increased strain.

In still other implementations, the fuel element 2702 has a smear density profile along the longitudinal axis designed to provide points of high strain at points that generally mirror points of high strain naturally occurring along the fuel assembly duct 2706. For example, the fuel assembly duct 2706 may have natural points of strain at various heights along the longitudinal axis, such as at an example high strain location 2712. For example, a pressure differential between interior and exterior walls of the fuel assembly duct 2706 may create a driving force that causes the wall of the fuel assembly duct 2706 to be in tension and swell away from the internal fuel elements proximal to one or more regions along the longitudinal axis (e.g., near the example high strain location 2712). This localized swelling can cause the walls of the fuel assembly duct 2706 to bow outward, widening a gap between the fuel elements and the walls of the fuel assembly duct. This effect permits coolant to bypass the center fuel elements rather than flowing between them, causing a thermal hydraulic penalty.

In one implementation, the fuel element 2702 has one or more points of locally enhanced strain at a height along its longitudinal axis that corresponds to a high strain point of the fuel assembly duct 2706. In general, points of increased strain in the fuel assembly duct 2706 can be identified by analyzing flux and pressure distributions. For example, high strain points may correlate with regions where the multiple of flux and pressure is highest. Once high strain regions of the fuel assembly duct 2706 are identified, corresponding high strain regions can be created in the fuel element 2702 by selectively varying smear density and/or cladding thickness along the longitudinal axis of the duct assembly 2706.

Although the present invention has been described in connection with embodiments thereof, it will be appreciated by those skilled in the art that additions, deletions, modifications, and substitutions not specifically described may be made without departure from the spirit and scope of the invention as defined in the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of manufacturing a fuel element, the method comprising:
    modeling fuel strain along a longitudinal axis of a fuel element;
    modeling a smear density profile along the longitudinal axis of the fuel element to offset the modeled fuel strain such that at least one region of locally decreased strain corresponds to a region of locally increased smear density wherein the smear density profile approximates an inverted Gaussian shape and wherein the fuel element comprises twelve zones and at least three sections, the first section proximate a first longitudinal end of the fuel element, a third section proximate a second longitudinal end of the fuel element, and a second section between the first and third sections, wherein an average smear density of the first section is greater than an average smear density of the second section, wherein an average smear density of the third section is greater than the smear density of the second section, and wherein the first section comprises five zones and the smear density profile of the zones of the first section varies according to a decreasing step function, wherein the second section comprises two zones and the smear density profile of the zones of the second section is constant, and wherein a third section comprises five zones and the smear density profile of the zones of the third section varies according to an increasing step function; and
    constructing the fuel element to have a tubular interior volume storing a fissionable composition, the fissionable composition in thermal transfer contact with an interior surface of the fuel element and having at least five different smear densities that vary along the longitudinal axis of the fuel element based on the modeled smear density profile.

2. The method of claim 1, wherein the smear density profile increases an average burnup of the fuel element.

3. The method of claim 1, wherein the smear density of the fuel element is higher at a first end of the fuel element than at a second opposite end of the fuel element.

4. The method of claim 3, wherein the first end of the fuel element is proximate a coolant entry point within a fuel assembly and the second opposite end of the fuel element is proximate a coolant exit point of the fuel assembly.

5. The method of claim 1, wherein the modeled smear density profile includes regions of increased smear density that correspond to regions of decreased neutron flux in the fuel element.

6. The method of claim 1, wherein constructing the fuel element further comprises constructing the fuel element to have a variable cladding thickness along the longitudinal axis to offset to offset the modeled fuel strain.

7. The method of claim 1, wherein constructing the fuel element further comprises:
   disposing a first fissionable composition within a first end section of the tubular interior volume, the first fissionable composition having a first average smear density;
   disposing a second fissionable composition within a central section of the tubular interior volume, the second fissionable composition having a second average smear density less than the first average smear density; and
   disposing a third fissionable composition within a second end section of the tubular interior volume, the third fissionable composition having a third average smear density greater than the second average smear density.

8. The method of claim 7, wherein the first end section and the second end section are equal length, and the first average smear density is greater than the third average smear density.

9. The method of claim 7, wherein smear density of the first fissionable composition varies according to a decreasing step function within the first end section and smear density of the third fissionable composition varies according to an increasing step function within the second end section.

10. The method of claim 7, wherein smear density of the first fissionable composition, second fissionable composition, and third fissionable composition varies continuously along a length of the fuel element and approximates an inverted Gaussian shape.

11. The method of claim 1, wherein smear density varies according to a step function.

12. The method of claim 7, wherein disposing a first fissionable composition within the first end section of the tubular interior volume comprises disposing a fissionable metal sponge.

13. The method of claim 7, wherein disposing a first fissionable composition within the first end section of in the tubular interior volume of comprises disposing fuel pellets.

* * * * *